United States Patent [19]

Seitz

[11] Patent Number: 4,709,018

[45] Date of Patent: Nov. 24, 1987

[54] FIBER-REACTIVE DYES CONTAINING HALOPYRIMIDINE RADICALS TO WHICH A VINYLSULFONYL OR THE LIKE GROUP IS ATTACHED BY MEANS OF A BRIDGE MEMBER

[75] Inventor: Karl Seitz, Oberwil, Switzerland

[73] Assignee: Ciba-Geigy Corporation, Ardsley, N.Y.

[21] Appl. No.: 645,796

[22] Filed: Aug. 30, 1984

[30] Foreign Application Priority Data

Aug. 30, 1983 [CH] Switzerland ................. 4751/83

[51] Int. Cl.⁴ ............... C09B 62/24; C09B 62/245; C09B 62/25; C09B 62/255

[52] U.S. Cl. ....................... 534/618; 534/617; 534/622; 534/625; 534/628; 534/629; 534/632; 534/635; 534/636; 534/637; 534/638; 534/641; 544/225; 544/243; 544/320; 544/328; 544/332; 544/333

[58] Field of Search ............... 534/618, 637, 638, 641, 534/617, 622, 625, 628, 629, 632, 635, 636; 544/225, 243, 320, 328, 332, 333

[56] References Cited

U.S. PATENT DOCUMENTS

| | | | |
|---|---|---|---|
| 4,126,609 | 11/1978 | Jager | 534/632 X |
| 4,191,687 | 3/1980 | Austin | 534/638 |
| 4,219,472 | 8/1980 | Hurter | 534/632 |
| 4,287,342 | 9/1981 | Hoegerle | 534/638 X |
| 4,288,363 | 9/1981 | Hurter | 534/632 X |
| 4,325,869 | 4/1982 | Seitz et al. | 260/146 |
| 4,425,270 | 1/1984 | Yamada et al. | 534/642 X |

FOREIGN PATENT DOCUMENTS

| | | | |
|---|---|---|---|
| 0070808 | 1/1983 | European Pat. Off. | 534/617 |
| 0084314 | 7/1983 | European Pat. Off. | 534/638 |
| 1119404 | 7/1968 | United Kingdom | 534/638 |
| 1576237 | 10/1980 | United Kingdom | 534/641 |

Primary Examiner—Floyd D. Higel
Attorney, Agent, or Firm—Wenderoth, Lind & Ponack

[57] ABSTRACT

Reactive dyes of the formula

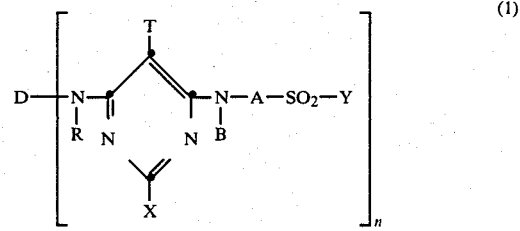

in which D is the radical of an organic dye of the monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, R is hydrogen or substituted or unsubstituted $C_{1-4}$-alkyl, X is a substituent which is detachable in the form of an anion, A is arylene or $C_{2-6}$-alkylene, Y is a $-CH=CH_2$ or $-CH_2CH_2-Z$ radical, Z is an inorganic or organic radical which is detachable under alkaline conditions, B is hydrogen or the radical of a substituted or unsubstituted hydrocarbon, T is a negative substituent, and n is 1 or 2, are suitable for dyeing or printing cellulose-containing and nitrogen-containing materials and produce, in high colouristic yields, dyeings and prints having good fastness properties.

19 Claims, No Drawings

FIBRE-REACTIVE DYES CONTAINING HALOPYRIMIDINE RADICALS TO WHICH A VINYLSULFONYL OR THE LIKE GROUP IS ATTACHED BY MEANS OF A BRIDGE MEMBER

The present invention relates to novel reactive dyes, to a process for their preparation, and to their use for dyeings or printing fibre materials.

The practice of dyeing with reactive dyes has in recent years led to increased demands on the quality of the dyeing and the economics of the dyeing process. There consequently continues to be a demand for new reactive dyes with improved properties, in particular application properties.

The demand these days in the dyeing of cotton by the cold pad-batch method is for reactive dyes which are sufficiently substantive at the low dyeing temperature and which also have good wash-off properties. They should also be highly reactive, so that only short pad-batching times are required, and they should in particular produce dyeings having high degrees of fixation. Existing dyes meet these requirements only to an insufficient degree.

It is therefore the object of the present invention to provide new, improved reactive dyes for the cold pad-batch method which have the qualities characterised above to a high degree. The new dyes should be distinguished especially by high degrees of fixation and high fibre-dye bond stabilities, and the unfixed portions on the fibre should moreover be readily washed off. They should also produce dyeings having good all-round fastness properties, for example light and wet fastness properties.

This object is achieved with the novel fibre-reactive dyes defined hereinafter.

The invention accordingly provides reactive dyes of the formula

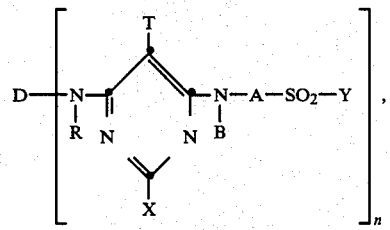

in which D is the radical of a dye of the monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, R is hydrogen or substituted or unsubstituted $C_{1-4}$-alkyl, X is a substituent which is detachable in the form of an anion, A is arylene or $C_{2-6}$-alkylene, Y is a —CH=CH$_2$ or —CH$_2$—CH$_2$—Z radical, Z is an inorganic or organic radical which is detachable under alkaline conditions, B is hydrogen or the radical of a substituted or unsubstituted hydrocarbon, T is a negative substituent, and n is 1 or 2.

The radical D in the formula (1) can contain, bonded to its basic structure, the substituents customary with organic dyes.

Example of further substituents on the radical D are alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, hydroxyl, carboxyl, sulfomethyl and sulfo. The radical D preferably contains one or more sulfonic acid groups. Reactive dyes of the formula (1) in which D is the radical of an azo dye contain as substituents especially methyl, ethyl, methoxy, ethoxy, acetylamino, benzoylamino, amino, chlorine, bromine, ureido, hydroxyl, carboxyl, sulfomethyl or sulfo.

An alkyl radical R is straight-chain or branched; it can be further substituted, for example by halogen, hydroxyl, cyano, $C_{1-4}$-alkoxyl, carboxyl or sulfo. Examples for R are the radicals methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, β-bromopropyl, β-hydroxyethyl, β-hydroxybutyl, β-cyanoethyl, sulfomethyl, β-sulfoethyl, aminosulfonylmethyl and β-sulfatoethyl. R is preferably hydrogen, methyl or ethyl.

Substituent X, which is detachable in the form of an anion, is for example a halogen atom, such as fluorine, chlorine or bromine, a low molecular weight alkylsulfonyl group, such as methylsulfonyl or ethylsulfonyl, a phenylsulfonyl radical, a sulfonic acid or phosphonic acid group or a quaternised group. X is preferably fluorine or chlorine.

An arylene bride member A is for example phenylene, naphthylene or the radical of biphenyl, stilbene, diphenylmethane or diphenyl ether. These radicals can contain further substituents, for example methyl, ethyl, methoxy, ethoxy, fluorine, chlorine, bromine, nitro, cyano, acetylamino, hydroxyl, carboxyl or sulfo. An arylene A is preferably phenylene or naphthylene. A $C_{2-6}$-alkylene radical A in formula (1) can be straight-chain or branched alkylene radical, for example ethylene, n-propylene, isopropylene, n-butylene, n-pentylene or n-hexylene. This radical can likewise be further substituted, for example by chlorine, cyano or hydroxyl. Preference is given to $C_{2-4}$-alkylene which contains no further substituents, in particular to ethylene.

An inorganic or organic radical Z which is detachable under alkaline conditions can be for example one of the following anionically detachable groups:

—OSO$_3$H, —SSO$_3$H, —OCOCH$_3$, —OPO$_3$H$_2$,

-continued

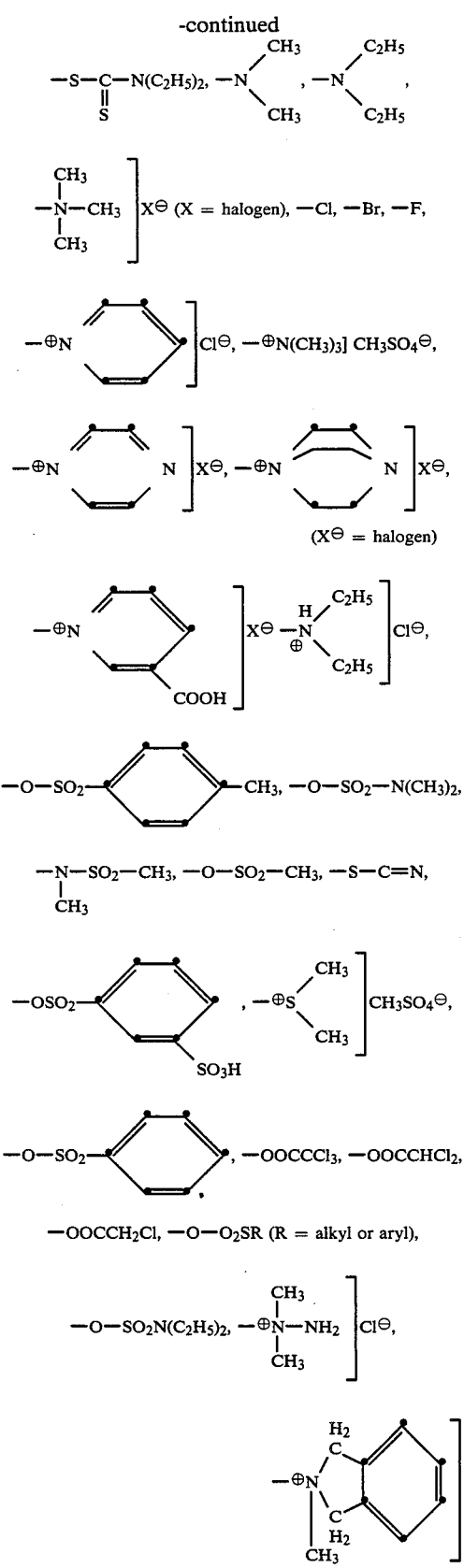

Z is preferably a —OSO₃H, —SSO₃H, —OCOCH₃, —OPO₃H₂ or —Cl radical.

A radical of a substituted or unsubstituted hydrocarbon, B is for example an alkyl radical which is straight-chain or branched, which preferably has 1 to 6 carbon atoms, and which can be further substituted, for example by halogen, hydroxyl, cyano, alkoxy, carboxyl or sulfo, or an unsubstituted alkyl radical having 7 to 20 carbon atoms, a cyclohexyl radical, or a phenyl radical which can be substituted, for example by methyl, ethyl, methoxy, ethoxy, chlorine, bromine, carboxyl, sulfo or sulfomethyl.

Examples of B are the following substituents: methyl, ethyl, propyl, isopropyl, butyl, isobutyl, sec.-butyl, tert.-butyl, pentyl, hexyl, nonyl, dodecyl, hexadecyl, pentadecyl, carboxymethyl, β-carboxyethyl, β-carboxypropyl, methoxycarbonylmethyl, ethoxycarbonylmethyl, β-methoxyethyl, β-ethoxyethyl, βmethoxypropyl, β-chloroethyl, β-chloropropyl, β-bromopropyl, sulfomethyl, β-sulfoethyl, aminosulfonylmethyl, β-sulfatoethyl, cyclohexyl, phenyl, o-, m- or p-chlorophenyl, o-, m- or p-methylphenyl, p-ethylphenyl, p-methoxyphenyl, o-, m- or p-sulfophenyl, p-carboxyphenyl and p-sulfomethylphenyl. Unsubstituted alkyl radicals having 1 to 4 carbon atoms are preferred.

B is in particular hydrogen or a radical of the formula $$-A-SO_2-Y \qquad (2),$$

in which A and Y are as defined under the formula (1). If B is a radical of the formula (2), then there are two radicals of the formula (2) bonded to the nitrogen atom of the external radical in the formula (1); the two radicals of the formula (2) can be identical or different. They are preferably identical.

The radical T is to be understood as meaning a negative substituent in the conventional sense. It is a key atom, for example chlorine, which, owing to its high core charge, attracts the bonding electrons more strongly than does the pyrimidine ring carbon atom to which T is bonded, and therefore induces a positive charge on the carbon; or it is a group of atoms, for example nitro, in which the positive charge on the atom bonded to the carbon has the same electron-attracting effect as the higher core charge on chlorine had and likewise gets the predominant share of the pair of bonding electrons and as a result causes the carbon to acquire a positive charge. Examples of possible negative substituents T are nitro, alkoxysulfonyl, alkylsulfonyl, alkylsulfinyl, cyano, alkoxycarbonyl, carboxyl, alkanoyl, chlorine and hydroxyl.

That part of the formula (1) which is enclosed in square brackets is a reactive radical which can occur once or twice at the molecule; the two possibilities are of equal importance. If n is 2, two reactive radicals can be identical or different; they are preferably identical. The reactive radical contains two substituents, namely X and Y, which can react in a manner of a nucleophilic substitution and in the manner of a nucleophilic addition.

Fibre-reactive compounds are to be understood as meaning compounds which are capable of reacting with the hydroxyl groups of cellulose, the amino, carboxyl, hydroxyl and thiol groups in wool and silk, or the amino and possibly carboxyl groups of synthetic polyamides and form covalent chemical bonds.

Preferred embodiments of the reactive dyes of the formula (1) are:

(a) reactive dyes of the formula (1) in which X is fluorine or chlorine;

(b) reactive dyes of the formula (1) in which T is methylsulfonyl;

(c) reactive dyes of the formula (1) in which B is hydrogen or $C_{1-4}$-alkyl and A is substituted or unsubstituted phenylene or naphthylene or $C_{2-6}$-alkylene;

(d) reactive dyes of the formula (1) in which B is a radical of the formula

—A—SO$_2$—Y (2)

in which A and Y are as defined under the formula (1); and (e) reactive dyes of the formula (1) in which A is ethylene.

The symbols of the formula (1) which were not mentioned under (a) to (e) are as defined under the formula (1). Also suitable are in particular combinations of features given under (a) to (e). Also preferred are:

(f) reactive dyes as per (c), of the formula

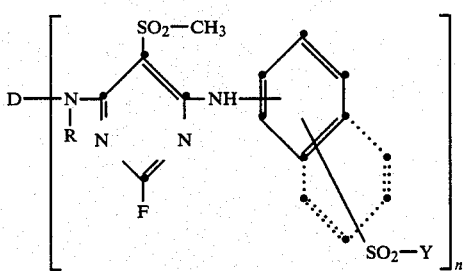

in which D, R, Y and n are as defined under the formula (1) and the benzene or naphthalene radical can contain further substituents in addition to —SO$_2$—Y;

(g) reactive dyes as per (c), of the formula

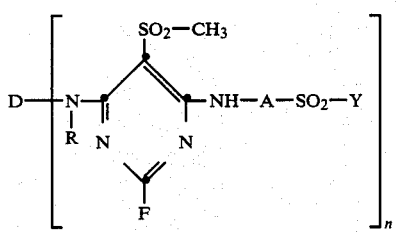

in which D, R, Y and n are as defined under the formula (1) and A is $C_{2-4}$-alkylene;

(h) reactive dyes as per (g) in which A is ethylene;

(i) reactive dyes as per (d), of the formula

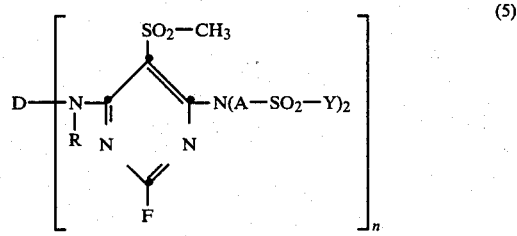

in which D, R, Y and n are as defined under the formula (1) and A is $C_{2-4}$-alkylene;

(j) reactive dyes as per (i) in which A is ethylene;

(k) reactive dyes of the formula (1) or as per (a) to (j) in which Y is vinyl, β-sulfatoethyl, β-thiosulfatoethyl, β-phosphatoethyl, β-chloroethyl or β-acetoxyethyl;

(l) reactive dyes of the formula (1) or as per (a) to (k) in which D is the radical of a monoazo or disazo dye;

(m) reactive dyes of the formula (1) or as per (a) to (k) in which D is the radical of a metal complex azo or formazan dye;

(n) reactive dyes of the formula (1) or as per (a) to (k) in which D is the radical of an anthraquinone dye; and (o) reactive dyes as per (m) in which D is the radical of a 1:1 copper complex azo dye of the benzene or naphthalene series and the copper atom is bonded on either side to a metallisable group in ortho-position relative to the azo bridge.

Particular preference is given to:

(p) reactive dyes as per (1), of the formula

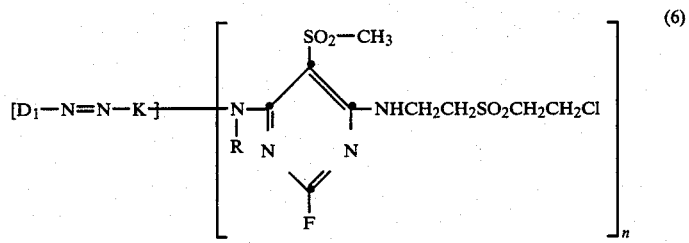

in which D$_1$ is the radical of a diazo component of the benzene or naphthalene series, K is the radical of a coupling component of the benzene or naphthalene series or of the heterocyclic series, R is hydrogen, methyl or ethyl, n is 1 or 2, and the reactive radical is bonded to the diazo component or to the coupling component, or a reactive radical each is bonded to the diazo component and to the coupling component;

(q) reactive dyes as per (1), of the formula

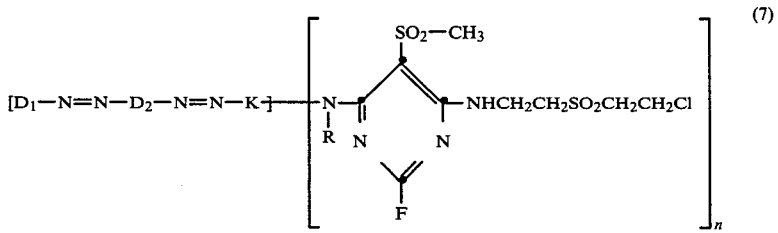
(7)

in which $D_1$ and $D_2$ are each a radical of a diazo component of the benzene or naphthalene series, K is the radical of a coupling component of the benzene or naphthalene series or of the heterocyclic series, R is hydrogen, methyl or ethyl, n is 1 or 2, and the reactive radical is bonded to diazo component $D_1$ or to coupling component K, or a reactive radical each is bonded to $D_1$ and K;

(r) reactive dyes as per (1), of the formula

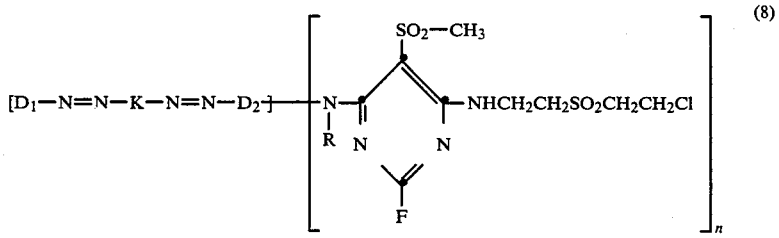
(8)

in which $D_1$ and $D_2$ are each a radical of a diazo component of the benzene or naphthalene series, K is the radical of a coupling component of the aminonaphtholsulfonic acid series, R is hydrogen, methyl or ethyl, n is 1 or 2, and the reactive radical is bonded to diazo component $D_1$ or to diazo component $D_2$, or a reactive radical each is bonded to $D_1$ and $D_2$; and (s) 1:1 copper complexes of reactive dyes as per (p) to (r).

The process for preparing the reactive dyes of the formula (1) comprises condensing, in any order, organic dyes of the formula

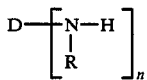
(9)

or dye precursors, at least one equivalent of a pyrimidine of the formula

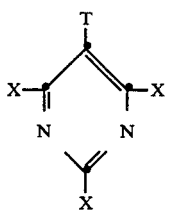
(10)

and at least one equivalent of an amine of the formula

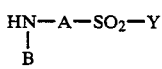
(11)

to give a reactive dye of the formula (1), D, R, n, X, T, A, Y and B in the formulae (9) to (11) being as defined under the formula (1), and if dye precursors are used converting these into the desired end dyes.

The process according to the invention can, if desired, be followed by a further conversion reaction. If the end dyes are prepared from precursors these conversion reactions are chiefly couplings leading to azo dyes.

As the individual steps of the process given above can be carried out in different orders, there are various possible process variants. In general, the reaction is carried out in successive steps, the order of the elementary reactions between the individual reactants advantageously being arranged in accordance with the particular conditions. As hydrolysis of the halogenopyrimidine radical can occur under certain conditions, any intermediate which contains acetylamino groups has to be hydrolysed (to split off the acetyl groups) before it is condensed with a halogenopyrimidine. Which reaction involved in preparing a secondary condensation product from an amine of the formula (11), the pyrimidine of the formula (10) and the organic dye of the formula (9) or a precursor is best carried out first, viz. that of the pyrimidine with the amine or that with the organic dye or a precursor thereof, varies from case to case and is arranged in particular in accordance with the solubility of the amino compounds involved and the basicity of the amino groups to be acylated. Another possible conversion reaction is a subsequent reaction at the radical X. If desired, detachable radicals X can be replaced by other detachable radicals after the condensation of the pyrimidine of the formula (1) with a dye of the formula (9) or with a dye precursor. For instance, a halogen atom can be replaced by a different halogen, using a halogenating agent. Reaction of tertiary bases, such as trimethylamine, pyridine or 1,4-diazabicyclo[2.2.2]octane, produces the corresponding amino compounds, and the quaternisation with hydrazines, such as N,N-dimethylhydrazine, the corresponding hydrazinium compounds. Sulfites, for example sodium sulfite, and sulfinates can be used to replace halogen by, respectively sulfo and sulfonyl, for example a 3'-carboxyphenylsulfonyl group or the like. The reaction with cyanides, for example potassium cyanide, and thiocyanates, for example potassium thiocyanate, can be used to replace chlorine by, respectively, nitrile and thiocyanate groups, which are likewise reactive. Furthermore, halogen atoms or other reactive groups can also be replaced, by their corresponding radicals, through the action of sodium azide or compounds which contain reactive methylene groups, for example cyanoacetates, malonates or acetyl acetone. A detachable substituent X can in many cases be replaced by other detachable substituents even before the pyrimidine of the formula (10) is condensed with a dye of the formula (9) or with a precursor thereof.

Furthermore, the synthesis can be followed by elimination reactions. It is possible, for example, to treat reactive dyes of the formula (1) which contain sulfatoethylsulfonyl radicals with agents, such as sodium hydroxide, which split off hydrogen halide so as to convert the sulfatoethylsulfonyl radicals into vinylsulfonyl radicals.

A modified form of the process comprises first of all preparing a dye which contains a precursor of the reactive radical and then to convert this precursor of the reactive radical and then converting this precursor stage, for example by an esterification or addition reaction, into the final stage. For instance, it is possible to prepare a dye in which Y is a HO—CH$_2$CH$_2$— radical and to react the intermediate with sulfuric acid before or after the acylation, so that the hydroxyl group is converted into the sulfato group; or to use an analogous dye in which Y is the H$_2$C=CH— vinyl group and to add thiosulfuric acid onto the intermediate, forming an HO$_3$SS—CH$_2$CH$_2$— radical. The hydroxyl group in a dye of the formula (1) or in a suitable precursor thereof is sulfated, for example, through reaction with concentrated sulfuric acid at 0° C. to moderately elevated temperatures. The sulfation can also be effected by reacting the hydroxy compound at 10° to 80° C. in a polar organic solvent, for example N-methylpyrrolidone, with two equivalents of chlorosulfonic acid per hydroxyl group. The sulfation is preferably effected by adding the compound in question at temperatures between 5° and 15° C. to sulfuric acid monohydrate. If Z is a radical which is detachable under alkaline conditions other than a sulfato group, for example if it is a thiosulfato group, it is introduced into a compound of the formula (1) or into an intermediate in conventional manner per se. The synthesis route via an intermediate of the reactive radical in many cases has a single product and goes to completion.

The process variant where the starting materials are dye precursors is suitable for preparing reactive dyes of the formula (1) in which D is the radical of a dye composed of two or more components. Examples of dyes of this type, composed of two or more components, are: monoazo, disazo, trisazo, metal complex azo, formazan and azomethine dyes. In principle, the reactive dyes of the formula (1) of all classes of dye can be prepared in a manner known per se or analogously to known procedures by starting from precursors or intermediates of dyes containing fibre-reactive radicals as shown in the formula (1), or introducing these fibre-reactive radicals into suitable intermediates having the characteristics of dyes.

Preference is given to reactive dyes of the formula (1) in which D is the radical of a monoazo or disazo dye or of a metal complex azo dye. In this case the reactive radicals of the formula

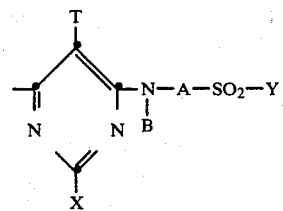

are bonded to the diazo or coupling component or, if n is 2, to different or identical radicals of starting components, i.e. diazo or coupling components. Preferably, in the event that n is 2, the two reactive radicals are bonded to separate components, one to the diazo component and the other to the coupling component. The reactive dyes then have for example the formulae

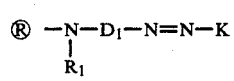

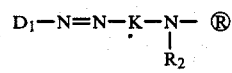

and

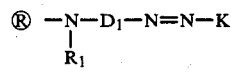

in which $R_1$ and $R_2$, independently of each other, are defined the same way as R in the formula (1), $D_1$ is the radical of a diazo component, K is the radical of a coupling component, and Ⓡ is a reactive radical of the formula (12). Also suitable are reactive dyes of the formulae (13) to (15) in which the radical $D_1$ and/or K includes a further reactive radical, so that trireactive and tetrareactive dyes are also coupled. The additional reactive radicals included in $D_1$ or K can be bonded to $D_1$ and/or K via an amino group, like Ⓡ, or in some other way, for example through a direct bond.

An additional reactive radical which can be included in $D_1$ or K is in particular a low molecular weight alkanoyl or alkylsulfonyl radical which is substituted by a detachable atom or a detachable group, a low molecular weight alkenoyl or alkenesulfonyl radical which is unsubstituted or substituted by a detachable atom or a detachable group, a carbonyl or sulfonyl group, a radical which contains carbocyclic or heterocyclic 4-, 5- or 6-membered rings and is substituted by a detachable atom of a detachable group, or is, or contains, a triazine or pyrimidine radical which is substituted by a detachable atom or a detachable group. Examples of reactive radicals of this type are any 6-membered heterocyclic radicals bonded via an amino group and containing halogen atoms, such as a halogenotriazine or halogenopyrimidine radical, or an aliphatic acyl radical, such as a halogenoacetyl or halogenopropionyl radical.

The additional reactive radical is in particular a vinylsulfonyl, β-sulfatoethylsulfonyl, β-thiosulfatoethylsulfonyl, β-chloroethylsulfonyl or β-acetoxyethylsulfonyl radical which is bonded directly or via a bridge member. Preference should thus also be given to dyes of the type depicted by way of illustration in the final three Examples.

The above explanations apply, analogously, also to disazo dyes (see Example 6) and metal complex azo dyes as well as to other chromophores mentioned in the definition of radical D in the formula (1).

Also suitable are reactive dyes of the formula (1) in which one of the reactive radicals, or both, are bonded to the chromophore via a radical of the formula

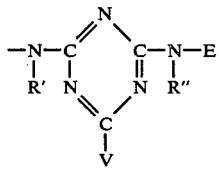

(16)

In these dyes the radical of the formula (12) is bonded to E via the —N(R)— group; E is a substituted or unsubstituted aliphatic or aromatic bridge member. Bridge member E is preferably an alkylene or arylene radical. For instance, E can be a long (for example of 10 or more carbon atoms) or shorter, straight-chain or branched alkylene radical; suitable alkylene radicals have in particular 2 to 6 carbon atoms, examples being ethylene, propylene, butylene, hexylene or cyclohexylene. An arylene radical E is for example a naphthylene radical, the radical of a diphenyl or of stilbene or in particular a phenylene radical. Radical E can contain further substituents, for example halogen atoms, such as fluorine, chlorine or bromine, alkyl groups having 1 to 4 carbon atoms, such as methyl, ethyl or propyl, alkoxy groups having 1 to 4 carbon atoms, such as methoxy, ethoxy, propyloxy or isopropyloxy, carboxyl or sulfo. R' and R'', independently of each other, are each hydrogen or a substituted or unsubstituted $C_{1-4}$-alkyl radical; and V is a halogen atom, a substituted or unsubstituted amino group, hydroxyl or an alkoxy, aryloxy, alkylthio or arylthio group.

If the starting materials used are dye precursors, reactive dyes of the formula (1) are prepared by condensing a —N(R)H-containing component of the dye of the formula (9) and a pyrimidine of the formula (10), condensing with an amine of the formula (11) beforehand or afterwards and reacting with the other component of the dye of the formula (9). In the synthesis of the preferred azo dyes the diazo components and the coupling components together must contain at least one —N(R)H amino group and can contain further amino groups. In this case the diazo components used are in particular 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid. If desired it is possible to use corresponding acetylamino or nitro compounds in which the acetylamino and nitro groups are converted into $H_2N$ groups by hydrolysis and reduction respectively before the condensation with the 2,4,6-trihalogenopyrimidine.

If groups capable of metal complex formation, such as hydroxyl, carboxyl, amino or sulfo, are present in the reactive dyes prepared, the reactive dyes can also be subsequently metallised. For example, metal complex azo dyes are obtained by treating azo compounds prepared according to the invention which contain complexing groups, for example hydroxyl or carboxyl groups, in ortho-ortho'-position relative to the azo bridge with heavy-metal donors before or, if desired, even after the condensation with the 2,4,6-trihalogenopyrimidine of the formula (10). Copper complexes of reactive dyes of the formula (1) are of particular interest. Metallisation can be effected not only by the method mentioned above but also by dealkylating metallisation and, for synthesising copper complexes, oxidative coppering.

The most important process variants are illustrated in the Examples.

There now follows a list of specific starting materials which can be used for preparing the reactive dyes of the formula (1).

Organic dyes of the formula (9)

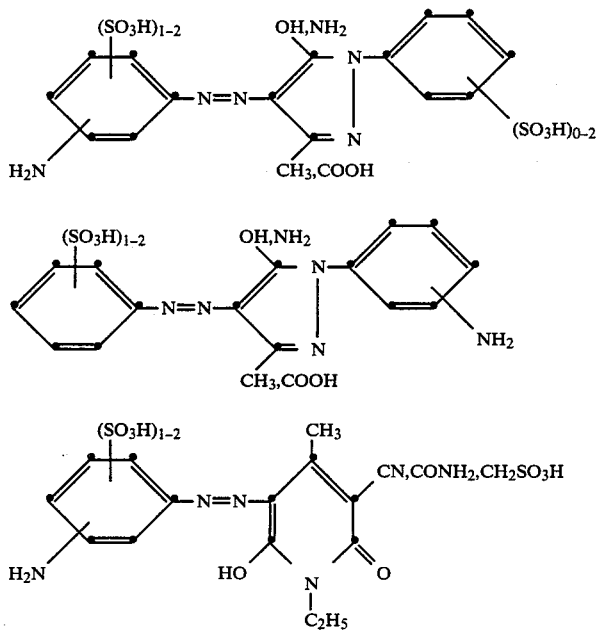

-continued
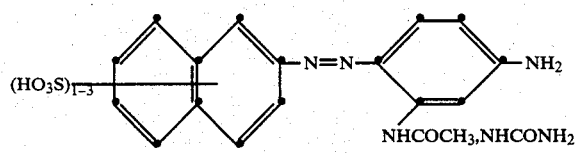
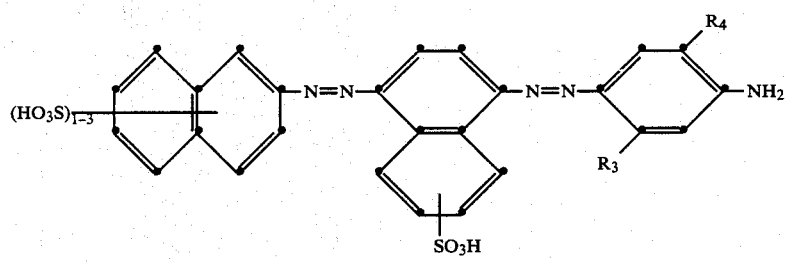
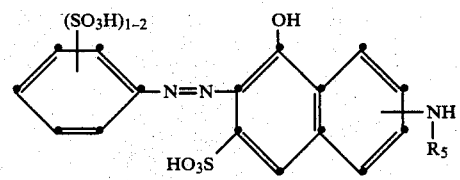
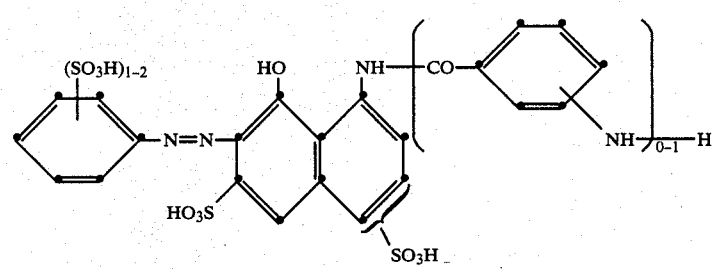
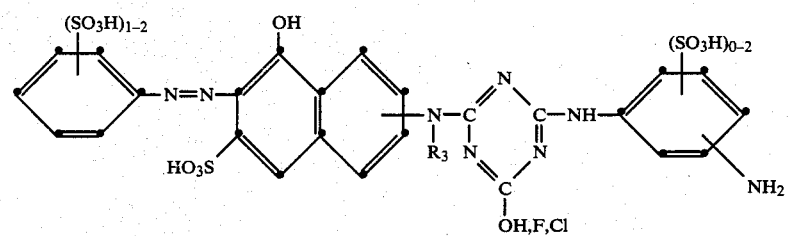
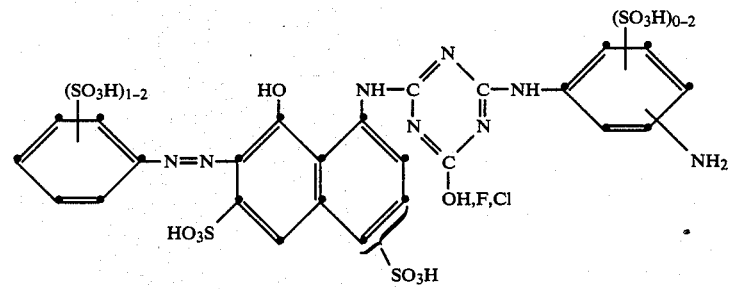
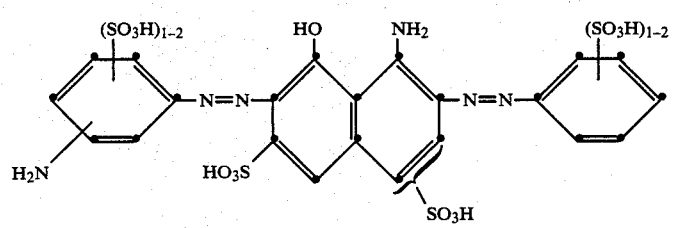

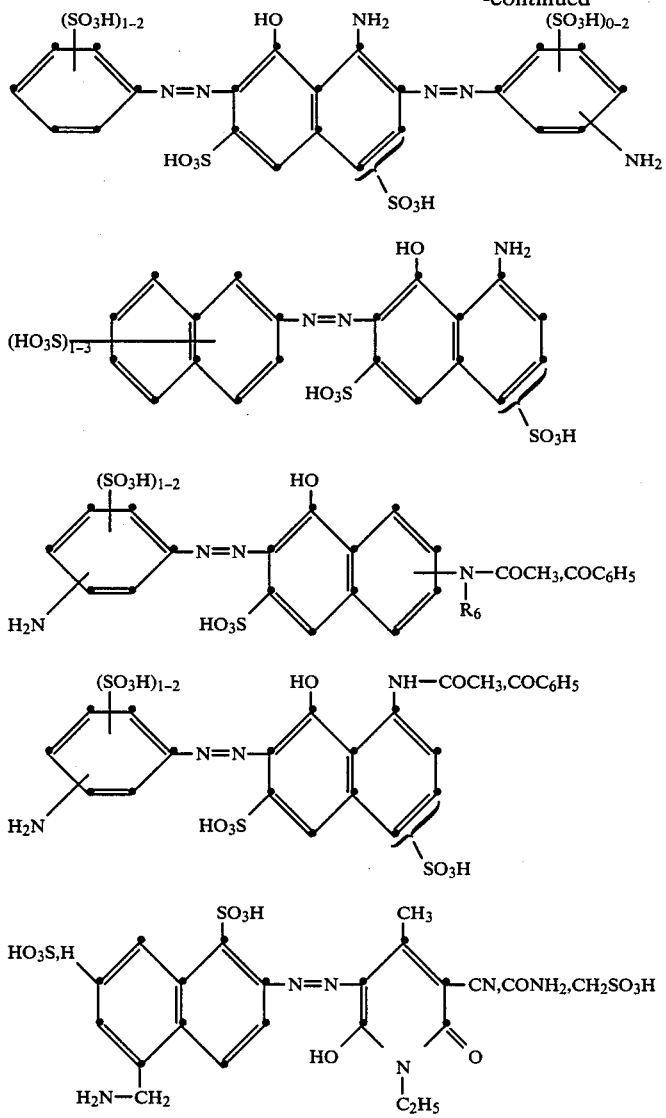
Metal complexes of dyes of the formulae:
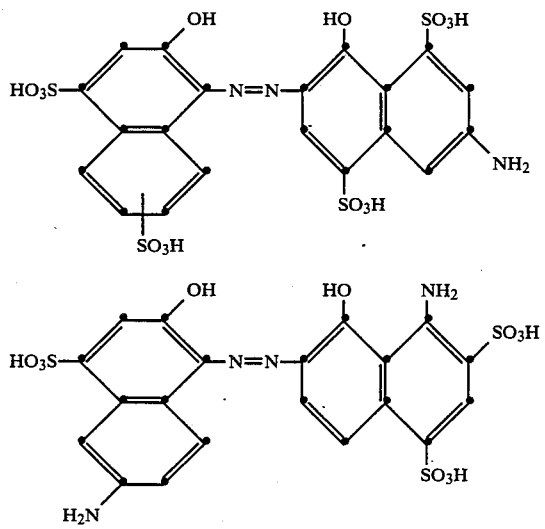

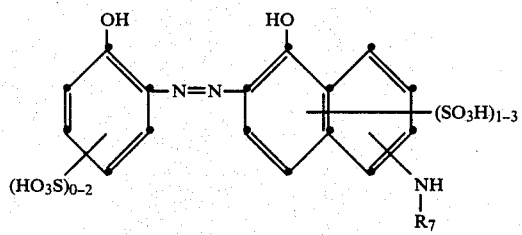
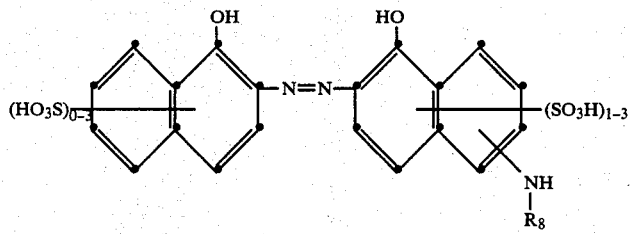
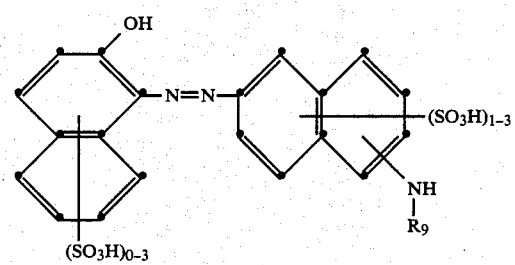
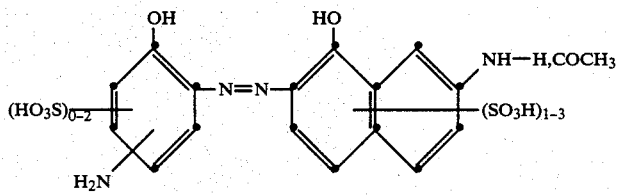
Preferred metal atoms are Cu (1:1 complex) or Cr and Co (1:2 complex). Cr- and Co-complexes can contain one or two molecules of the azo component of the formula given above, i.e. these complexes can be symmetrical or contain any other ligand and be asymmetrical.
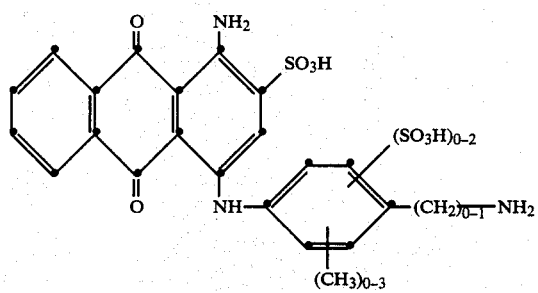
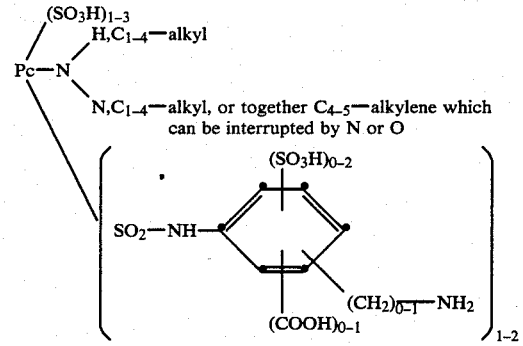
In this formula Pc is the Cu or Ni phthalocyanine radical; the total number of substituents on the Pc skeleton is 4.

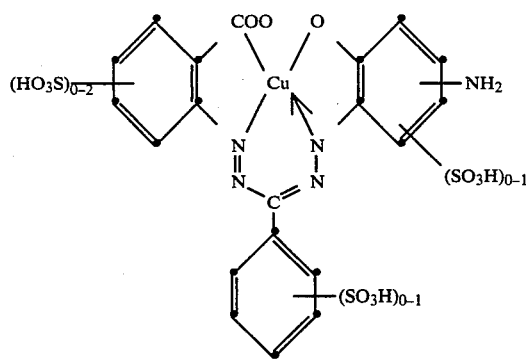
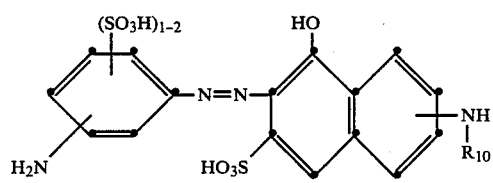
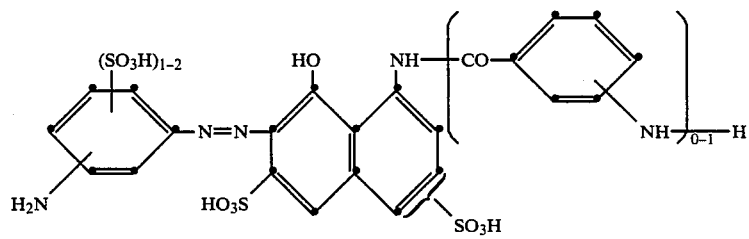
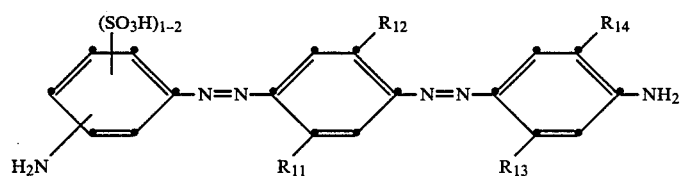
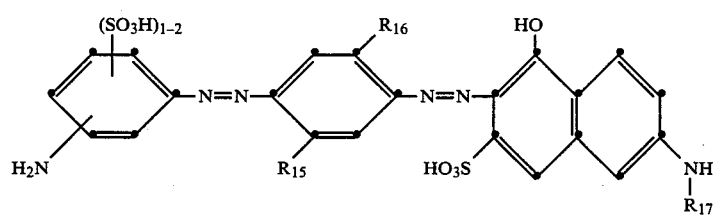
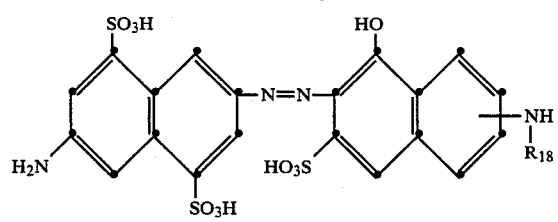
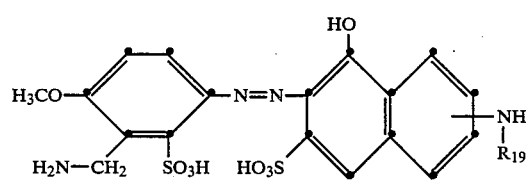

-continued
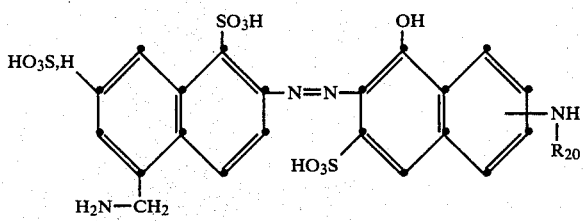
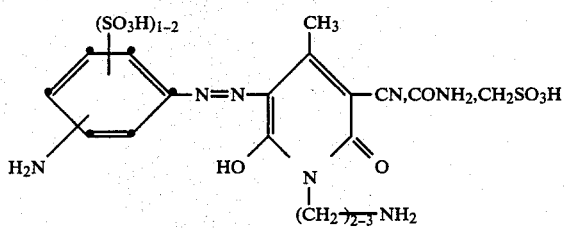
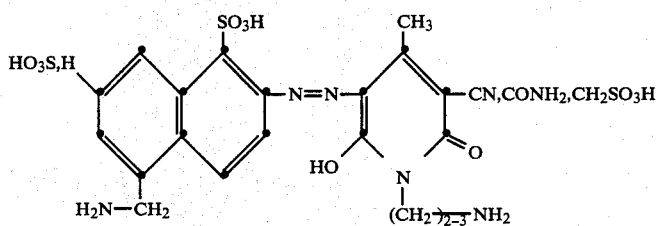
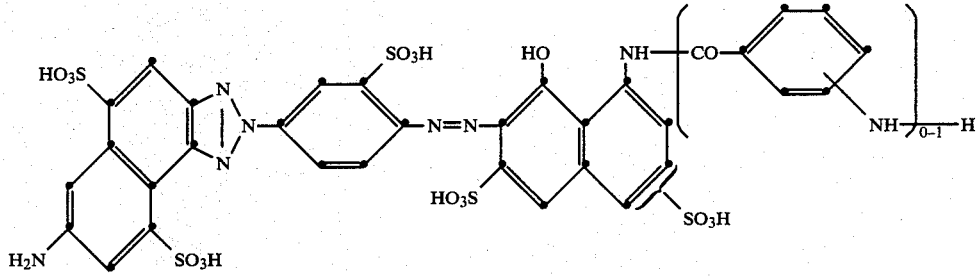
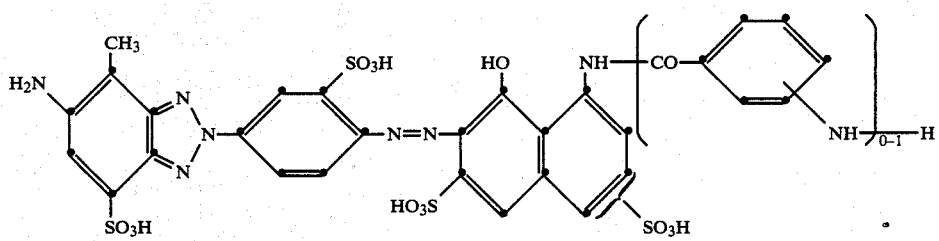
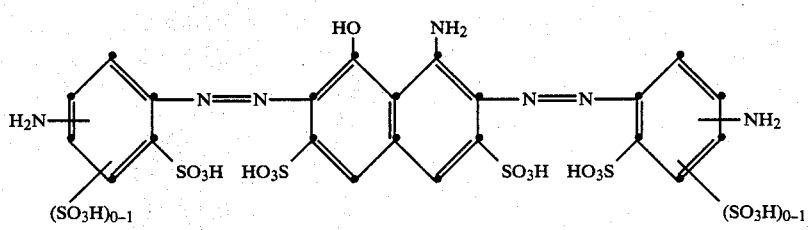

-continued

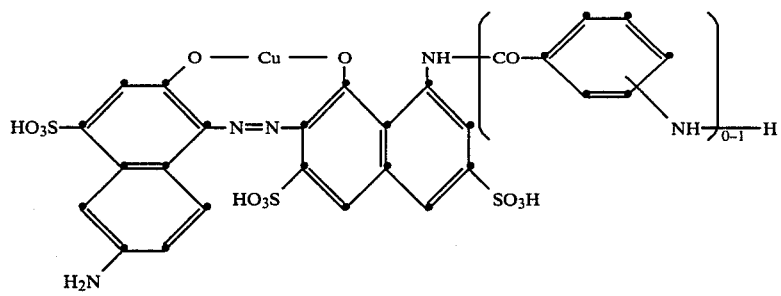

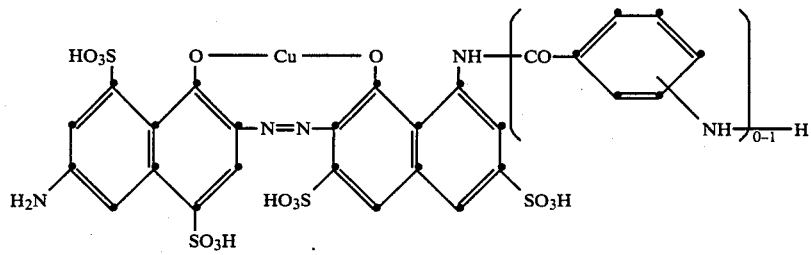

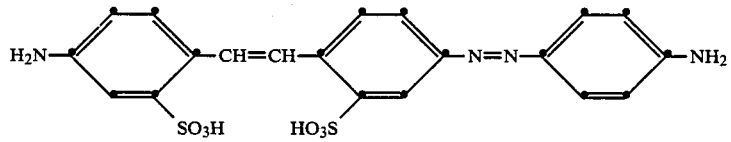

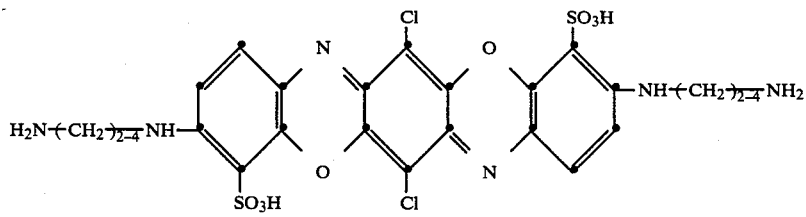

In the formulae shown above the radicals $R_5$ to $R_{10}$ and $R_{17}$ to $R_{20}$ are each hydrogen or $C_{1-4}$-alkyl, and the radicals $R_3$, $R_4$ and $R_{11}$ to $R_{16}$ are each hydrogen, $C_{1-4}$-alkyl, $C_{1-4}$-alkoxy, $C_{1-4}$-alkyanoylamino, ureido or halogen independently of one another where they belong to one and the same formula. Preferably the radicals $R_5$ to $R_{10}$ and $R_{17}$ to $R_{20}$ are each hydrogen, methyl or ethyl and the radicals $R_3$, $R_4$ and $R_{11}$ to $R_{16}$ are each hydrogen, methyl, methoxy, ethoxy, acetylamino, ureido or chlorine. The aromatic rings in the above dyes can be further substituted, the benzene rings especially by methyl, methoxy, ethoxy, carboxyl, acetylamino or chlorine and the naphthalene rings in particular by methoxy, carboxyl, acetylamino, nitro or chlorine; the same applies to the anthraquinones, dioxazines and so on. The benzene rings are preferably not further substituted. The diazo components used in this case are in particular 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid.

Specific diazo and coupling components are:
Diazo components:
Aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-aminobiphenyl, 1-aminobenzene-2-, -3- or -4-carboxylic acid, 2-aminodiphenylether, 1-aminobenzene-2-, -3- or -4-sulfonic acid, -N-methylamide, -N-ethylamide, -N,N-dimethylamide or -N,N-diethylamide, dehydrothio-p-toluidine-sulfonic acid, 1-amino-3-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino- 1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-m, -7- or -8-sulfonic acid, 2-aminonaphthalene-3,6- or -5,7-disulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxyl-2-aminobenzene-4-sulfonic acid, 1-hydroxyl-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-6-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl(benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl(diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid and 1-amino-4-methoxy-5-aminomethylbenzene-6-sulfonic acid.

If the diazo component to be used is not a diamine but is an aminoacetylamino compound from which the acetyl group is subsequently to be reeliminated by hydrolysis, as mentioned above in the description of the process, the monoacetyl compounds of the abovementioned diazo components are possible, examples being 1-acetylamino-3-aminobenzene-4-sulfonic acid and 1-acetylamino-4-aminobenzene-3-sulfonic acid.

Examples of aromatic amines which can serve as diazo components in preparing the monoazo or polyazo dyes and which contain a vinylsulfonyl group or an equivalent reactive radical are:

1-Amino-4-$\beta$-sulfatoethylsulfonylbenzene, 1-amino-4-$\beta$-thiosulfatoethylsulfonylbenzene, 1-amino-4-vinylsulfonylbenzene, 1-amino-4-$\beta$-chloroethylsulfonylbenzene, 1-amino-3-$\beta$-sulfatoethylsulfonylbenzene, 1-amino-3-vinylsulfonylbenzene, 1-amino-2-methoxy-5-$\beta$-sulfatoethylsulfonylbenzene, 1-amino-2-methoxy-5-$\beta$-thiosulfatoethylsulfonylbenzene, 1-amino-2-methoxy-5-vinylsulfonylbenzene, 1-amino-4-methoxy-3-$\beta$-sulfatoethylsulfonylbenzene, 1-amino-4-methoxy-3-$\beta$-vinylsulfonylbenzene, 1-amino-2,5-dimethoxy-4-$\beta$-sulfatoethylsulfonylbenzene, 1-amino-2,5-dimethoxy-4-vinylsulfonylbenzene, 1-amino-2-methoxy-4-$\beta$-sulfatoethylsulfonyl-5-methylbenzene, 1-amino-2-methoxy-4-vinylsulfonyl-5-methylbenzene, 1-amino-3-$\beta$-sulfatoethylsulfonyl-6-carboxybenzene, 1-amino-3-vinylsulfonyl-6-carboxybenzene, 1-amino-4-$\beta$-sulfatoethylsulfonylbenzene-2-sulfonic acid, 1-amino-4-vinylsulfonylbenzene-2-sulfonic acid, 1-amino-5-vinylsulfonylbenzene-2,4-disulfonic acid, 1-amino-2-hydroxy-5-$\beta$-sulfatoethylsulfonylbenzene, 1-amino-2-hydroxy-4-$\beta$-sulfatoethylsulfonylbenzene, 1-amino-2-hydroxy-5-$\beta$-sulfatoethylsulfonylbenzene-3-sulfonic acid, 1-amino-2-bromo-4-$\beta$-sulfatoethylsulfonylbenzene, 1-amino-2,6-dichloro-4-$\beta$-sulfatoethylsulfonylbenzene, 1-amino-2,4-di-($\beta$-sulfatoethylsulfonyl)-benzene, 1-amino-2,4-di-($\beta$-sulfatoethylsulfonyl)-5-chlorobenzene, 1-amino-2,4-di-($\beta$-thiosulfatoethylsulfonyl)-5-chlorobenzene, 1-amino-2,4-di-(vinylsulfonyl)benzene, 1-amino-2,4-di-(vinylsulfonyl)-5-chlorobenzene, 1-amino-2,4-di-($\beta$-acetoxyethylsulfonyl)-benzene, 1-amino-2,4-di-($\beta$-acetoxyethysulfonyl)-5-chlorobenzene, 2-amino-8-$\beta$-sulfatoethylsulfonylnaphthalene, 2-amino-6-$\beta$-sulfatoethylsulfonylnaphthalene, 2-amino-6-$\beta$-sulfatoethylsulfonylnaphthalene-1-sulfonic acid, 2-amino-8-$\beta$-sulfatoethylsulfonylnaphthalene-6-sulfonic acid and 2-amino-6,8-di-($\beta$-sulfatoethylsulfonyl)-naphthalene.

Coupling components:

Phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4′-aminobenzoylamino)-8-hydroxynaphthalene-3,6- or -4,6-disulfonic acid, 1-(4′-nitrobenzoylamino)-8-hydroxynaphthalene-3,6- or -4,6-disulfonic acid, 1-(3′-aminobenzoylamino)-8-hydroxynaphthalene-3,6- or -4,6-disulfonic acid, 1-(3′-nitrobenzoylamino)-8-hydroxynaphthalene-3,6- or 4,6-disulfonic acid, 2-(4′-amino-3′-sulfophenylamino)-5-hydroxynaphthalene-7-sulfonic acid, 3-methylpyrazol-5-one, 1-phenyl-3-methyl-5-pyrazolone, 1-(4′-sulfophenyl)-3-methyl-5-pyrazolone, 1-(4′-sulfophenyl)-pyrazol-5-one-3-carboxylic acid, 1-(3′-aminophenyl)-3-methyl-5-pyrazolone, 1-(2′,5′-disulfophenyl)-3-methyl-5-pyrazolone, 1-(2′-methyl-4′-sulfophenyl)-5-pyrazolone-3-carboxylic acid, 1-(4′,8′-disulfonaphth-2′-yl)-3-methyl-5-pyrazolone, 1-(5′,7′-disulfonaphth-2-yl)-3-methyl-5-pyrazolone, 1-(2′,5′-dichloro-4′-sulfophenyl)-3-methyl-5-pyrazolone, 3-aminocarbonyl-4-methyl-6-hydroxypyrid-2-one, 1-ethyl-3-cyano- or -3-chloro-4-methyl-6-hydroxypyrid-2-one, 1-ethyl-3,3-sulfomethyl-4-methyl-6-hydroxypyrid-2-one, 2,4,6-triamino-3-cyanopyridine, 2-(3′-sulfophenylamino)-4,6-diamino-3-cyanopyridine, 2-(2′-hydroxyethylamino)-3-cyano-4-methyl-6-aminopyridine, 2,6-bis-(2′-hydroxyethylamino)-3-cyano-4-methylpyridine, 1-ethyl-3-carbamoyl-4-methyl-6-hydroxypyrid-2-one, 1-ethyl-3-sulfomethyl-4-methyl-5-carbamoyl-6-hydroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)naphthalene-3,6-disulfonic acid, 1-amino-8-hydroxy-2-(4′-sulfophenylazo)-naphthalene-3,6-disulfonic acid, 1-amino-8hydroxy-2-(2′,5′-disulfophenylazo)-naphthalene-3,6-disulfonic acid, 1-β-aminoethyl-3-cyano-4-methyl-6-hydroxypyrid-2-one, 1-γ-aminopropyl-3-sulfomethyl-4-methyl-6-hydroxyprid-2-one, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfatoethylamino-4-methoxybenzene, 1-amino-3-sulfobenzylaminobenzene, 1-amino-3-sulfobenzylamino-4-chlorobenzene and 1-amino-3-N,N-disulfobenzylaminobenzene.

Pyrimidines of the formula (10)

2,4,5,6-tetrachloropyrimidine, 2,4,5,6-tetrafluoropyrimidine, 2,4,5,6-tetrabromopyrimidine, 2,4,6-trichloro-5-methylsulfinylpyrimidine, 2,4,6-trifluoro-5-methylsulfinylpyrimidine, 2,4,6-tribromo-5-methylsulfinylpyrimidine, 2,4,6-trichloro-5-ethylsulfinylpyrimidine, 2,4,6-trichloro-5-n-propylsulfinylpyrimidine, 2,4,6-trichloro-5-n-butylsulfinylpyrimidine, 2,4,6-trichloro-5-isopropylsulfinylpyrimidine, 2,4,6-trichloro-5-tert.-butylsulfinylpyrimidine, 2,4,6-trichloro-5-methylsulfonylpyrimidine, 2,4,6-tribromo-5-methylsulfonylpyrimidine, 2,4,6-trifluoro-5-methylsulfonylpyrimidine, 2,4,6-trichloro-5-ethylsulfonylpyrimidine, 2,4,6-trichloro-5-isopropylsulfonylpyrimidine, 2,4,6-trichloro-5-n-butylsulfonylpyrimidine, 2,4,6-trichloro-5-chloromethylsulfonylpyrimidine, 2,4,6-trichloro-5-β-chloroethylsulfonylpyrimidine, 2,4,6-trichloro-5-trifluoromethylsulfonylpyrimidine, 2,4,6-trichloro-5-perfluorobutylsulfonylpyrimidine, 2,4,6-trichloro-5-ethoxymethylsulfonylpyrimidine, 2,4,6-trifluoro-5-ethoxyethylsulfonylpyrimidine, 2,4,6-tribromo-5-isopropoxymethylsulfonylpyrimidine, 2,4,6-trichloro-5-benzylsulfonylpyrimidine, 2,4,6-tribromo-5-benzylsulfonylpyrimidine, 2,4,6-trifluoro-5-benzylsulfonylpyrimidine, 2,4,6-trichloro-5-phenethylsulfonylpyrimidine, 2,4-dichloro-6-bromo-5-methylsulfonylpyrimidine, 2,4-dichloro-6-fluoro-5-methylsulfonylpyrimidine, 2,4-dichloro-6-fluoro-5-methylsulfonylpyrimidine, 2-chloro-4,6-difluoro-5-methylsulfonylpyrimidine, 2-chloro-4,6-dibromo-5-methylsulfonylpyrimidine, 2-bromo-4,6-difluoro-5-methylsulfonylpyrimidine, 2-chloro-4,6-difluoro-5-ethylsulfonylpyrimidine, 2,4,6-trichloro-5-carboxypyrimidine, 2,4,6-trifluoro-5-carboxypyrimidine and 2,4,6-trichloro-5-cyanopyrimidine.

2,4,6-Trifluoro-5-methylsulfonylpyrimidine is preferred.

Amines of the formula (11)

1-Aminophenyl-2-, -3- or -4-β-sulfatoethyl sulfone, 1-aminophenyl-3-β-phosphatoethyl sulfone, 1-amino-4-methylphenyl-3-β-sulfatoethyl sulfone, 1-aminophenyl-3-β-chloroethyl sulfone, 1-amino-4-methoxyphenyl-3-β-sulfatoethyl sulfone, 1-amino-2-sulfophenyl-4-β-sulfatoethyl sulfone, 1-amino-2-sulfophenyl-5-β-sulfatoethyl sulfone, 1-amino-2,4-disulfophenyl-5-β-sulfatoethyl sulfone, 1-aminonaphthalene-4-β-sulfatoethyl sulfone, 1-amino-2,5-dimethoxyphenyl-4-β-sulfatoethyl sulfone, 1-amino-2-carboxylphenyl-4-β-sulfatoethyl sulfone, 1-amino-2-carboxylphenyl-5-β-sulfatoethyl sulfone, 1-amino-2-methoxyphenyl-4-β-sulfatoethyl sulfone, 1-amino-2-chorophenyl-4-β-sulfatoethyl sulfone, 1-amino-2-methoxyphenyl-5-β-sulfatoethyl sulfone, 2-aminonaphthyl-8-β-sulfatoethyl sulfone, 2-amino-6-sulfonaphthyl-8-β-sulfatoethyl sulfone, 1-amino-2,5-dimethoxyphenyl-4-vinyl sulfone, 1-amino-2-methoxy-5-methylphenyl-4-β-sulfatoethyl sulfone, 1-amino-2,5-diethoxyphenyl-4-β-sulfatoethyl sulfone, 1-amino-2-bromophenyl-4-β-sulfatoethyl sulfone, 1-amino-2-bromophenyl-4-vinyl sulfone, 1-amino-2,4-disulfophenyl-5-vinyl sulfone, 1-amino-2,4-disulfophenyl-5-β-phosphatoethyl sulfone, 1-amino-2,4-disulfophenyl-5-β-chloroethyl sulfone, 2-amino-6-sulfonaphthyl-8-β-phosphatoethyl sulfone, 2-amino-6-sulfonaphthyl-8-vinyl sulfone, 1-amino-2-methoxy-5-methylphenyl-4-β-chloroethyl sulfone, 2-aminophenol-4-β-sulfatoethyl sulfone, 1-aminophenyl-3- or -4-vinyl sulfone, 1-amino-2-hydroxyphenyl-4-β-sulfatoethyl sulfone, 1-amino-5-vinyl sulfone-2-sulfonic acid 3-(N-methyl-β-sulfatoethylsulfonyl-amino)-1-aminobenzene, 3-(N-ethyl-β-sulfatoethylsulfonyl-amino)-1-aminobenzene and 3-β-sulfatoethylsulfonylamino-1-aminobenzene.

1-Aminobenzene-3-β-sulfatoethyl sulfone is preferred.

β-(β-Chloroethylsulfonyl)-ethylamine, β-(β-bromoethylsulfonyl)-ethylamine, β-vinylsulfonylethylamino), γ-(β-chloroethylsulfonyl)-propylamine, α-(β-chloroethylsulfonyl)-isopropylamine, δ-(β-chloroethylsulfonyl)-butylamine, β-(β-chloroethylsulfonyl)-isobutylamine, ε-(β-chloroethylsulfonyl)-pentylamine, β-(β-chloroethylsulfonyl)-hexylamine, N-methyl-N-β-(β-chloroethylsulfonyl)-ethylamine, N-ethyl-N-β-(β-chloroethylsulfonyl)-ethylamine, N-propyl-N-β-(β- chloroethylsulfonyl)-ethylamine, N-butyl-N-β-(β-chloroethylsulfonyl)-ethylamine, N-pentyl-N-β-(β-chloroethylsulfonyl)-ethylamine, N-hexyl-N-β-(β-chloroethylsulfonyl)-ethylamine, N-nonyl-N-β-(β-chloroethylsulfonyl)-ethylamine, N-dodecyl-N-β-(β-chloroethylsulfonyl)-ethylamine, N-hexadecyl-N-β-(β-chloroethylsulfonyl)-ethylamine, N-octadecyl-N-β-(β-chloroethylsulfonyl)-ethylamine, N-carboxymethyl-N-β-(β-bromoethylsulfonyl)-ethylamine, N-sulfatomethyl-N-β-(β-chloroethylsulfonyl)-ethylamine, N-β-carboxyethyl-N-γ-(β-chloroethylsulfonyl)-propylamine, N-β-sulfatoethyl-N-δ-(β-chloroethylsulfonyl)-propylamine, N-β-sulfatoethyl-N-δ-(β-chloroethylsulfonyl)-butylamine, N-β-ethoxyethyl-N-δ-(β-chloroethylsulfonyl)-butylamine, N-γ-chloropropyl-N-β-(β-chloroethylsulfonyl)-ethylamine, N-phenyl-N-β-(β-chloroethylsulfonyl)-ethylamine, N-p-chlorophenyl-N-β-(β-chloroethylsulfonyl)-ethylamine, N-o-methylphenyl-N-β-(β-chloroethylsulfonyl)-ethylamine, N-p-methoxyphenyl-N-β-(β-chloroethylsulfonyl)-ethylamine, N-m-sulfophenyl-N-β-(β-chloroethylsulfonyl)-ethylamine, N-p-sulfophenyl-N-β-(β-chloroethylsulfonyl)-ethylamine, bis-[(β-(β-chloroethylsulfonyl)ethyl]-amine, bis-[β-(β-bromoethylsulfonyl)-ethyl]-amine, bis-[γ-(β-chloroethylsulfonyl)-propyl]-amine, bis-[δ-(β-chloroethylsulfonyl)-butyl]-amine and bis-(β-vinylsulfonylethyl)-amine.

Preference is given to amines of low molecular weight, such as β-(β-chloroethylsulfonyl)-ethylamine and its N-methyl derivative. bis-[β-(β-Chloroethylsulfonyl)-ethyl]-amine is also preferred.

β-(β-Hydroxyethylsulfonyl)-ethylamine (2-taurylethanol), γ-(β-hydroxyethylsulfonyl)-propylamine, α-(β-hydroxyethylsulfonyl)-isopropylamine, δ-(β-hydroxyethylsulfonyl)-butylamine, β-(β-hydroxyethylsulfonyl)-isobutylamine, ε-(β-hydroxyethylsulfonyl)-pentylamine, β-(β-hydroxyethylsulfonyl)-hexylamine, N-methyl-N-β-(β-hydroxyethylsulfonyl)-ethylamine, N-ethyl-N-β-(β-hydroxyethylsulfonyl)-ethylamine, N-propyl-N-β-(β-hydroxyethylsulfonyl)-ethylamine, N-butyl-N-β-(β-hydroxyethylsulfonyl)-ethylamine, N-pentyl-N-β-(β-hydroxyethylsulfonyl)-ethylamine, N-hexyl-N-β-(β-hydroxyethylsulfonyl)-ethylamine, N-nonyl-N-β-(β-hydroxyethylsulfonyl)-ethylamine, N-dodecyl-N-β-(β-hydroxyethylsulfonyl)-ethylamine, N-hexadecyl-N-β-(β-hydroxyethylsulfonyl)-ethylamine, N-octadecyl-N-β-(β-hydroxyethylsulfonyl)-ethylamine, N-carboxymethyl-N-β-(β-hydroxyethylsulfonyl)-ethylamine, N-sulfatomethyl-N-β-(β-hydroxyethylsulfonyl)-ethylamine, N-β-carboxymethyl-N-γ-(β-hydroxyethylsulfonyl)-propylamine, N-β-sulfatoethyl-N-γ-(β-hydroxyethylsulfonyl)-propylamine, N-β-sulfatoethyl-N-δ-(β-hydroxyethylsulfonyl)-butylamine, N-β-ethoxyethyl-N-δ-(β-hydroxyethylsulfonyl)-butylamine, N-γ-chloropropyl-N-β-(β-hydroxyethylsulfonyl)-ethylamine, N-phenyl-N-β-(β-hydroxyethylsulfonyl)-ethylamine, N-p-chlorophenyl-N-β-(β-hydroxyethylsulfonyl)-ethylamine, N-o-methylphenyl-N-β-(β-hydroxyethylsulfonyl)-ethylamine, N-p-methoxyphenyl-N-β-(β-hydroxyethylsulfonyl)-ethylamine, N-m-sulfophenyl-N-β-(β-hydroxyethylsulfonyl)-ethylamine, N-p-sulfophenyl-N-β-(β-hydroxyethylsulfonyl)-ethylamine, bis-[β-(β-hydroxyethylsulfonyl)-ethyl]-amine, bis-[γ-(β-hydroxyethylsulfonyl)-propyl]-amine, bis[δ-(β-hydroxyethylsulfonyl)-butyl]-amine, and the corresponding sulfated compounds.

Reference is given to amines of low molecular weight, such as β-(β-hydroxyethylsulfonyl)-ethylamine and its N-methyl derivative. bis-[β-(β-Hydroxyethylsulfonyl)-ethyl]-amine and the corresponding sulfated compounds are also preferred.

Diazo components or the intermediates containing a diazotisable amino group are generally diazotised at low temperatures in aqueous mineral acid solutions through the action of nitrous acid. The coupling onto the coupling component takes place at strongly acid, neutral or weakly alkaline pH.

The pyrimidines of the formula (10) are preferably condensed with the diazo components and the coupling components and with the amines or with acylatable monoazo or disazo intermediates or with the amino-containing dyes at low temperatures and at weakly acid, neutral or weakly alkaline pH in aqueous solutions or suspensions. The hydrogen halide liberated in the course of the condensation is advantageously continuously neutralised by adding aqueous alkali metal hydroxides, carbonates or bicarbonates.

The reactive dyes of the formula (1) are suitable for dyeing and printing a very wide variety of different materials, such as silk, leather, wool, nylon fibres and polyurethanes, and in particular cellulose-containing fibre materials of any kind. Examples of such fibre materials are the natural cellulose fibres, such as cotton, linen and hemp, as well as pulp and regenerated cellulose. The reactive dyes of the formula (1) are also suitable for dyeing or printing hydroxy-containing fibres contained in blend fabrics, for example blends of cotton with polyester fibres or nylon fibres.

The dyes according to the invention can be applied to the fibre material and fixed on the fibre in various ways, in particular in the form of aqueous dye solutions and print pastes. They are suitable not only for the exhaust method of dyeing but also for dyeing by the pad-dyeing method whereby the cloth is impregnated with aqueous dye solutions which can, if desired, also contain salt, and the dyes are fixed, if desired under heat, after a treatment with alkali or in the presence of alkali. They are particularly suitable for the so-called cold pad-batch method whereby the dye is applied on a pad-mangle together with the alkali and is then fixed through several hours' storage at room temperature. After the fixing the dyeings or prints are thoroughly rinsed with cold and hot water which can, if desired, also contain an agent acting like a dispersant and promoting the diffusion of the unfixed portions.

The reactive dyes of the formula (1) are distinguished by high reactivity and good fixing properties. They can therefore be used in exhaust dyeing at low dye temperatures and require only short steaming times in the pad-steam process. The degrees of fixation are high, and the unfixed portions are readily washed off, the difference between the degree of exhaustion and the degree of fixation being remarkably small, i.e. the hydrolysis loss being very low. The reactive dyes of the formula (1) are also suitable for printing, especially on cotton, but also for printing nitrogen-containing fibres, for example wool, silk or wool-containing blend fabrics.

The dyeings and prints prepared with the dyes according to the invention are distinguished in that the dyeings and prints on cellulose fibre materials are of high tinctorial strength and have a high fibredye bond stability not only in the acid but also in the alkaline range, and also good lightfastness and very good wetfastness properties, such as wash, water, sea water, cross-dyeing and perspiration fastness properties, as well as a good fastness to pleating, hot-press fastness and rub fastness.

The following Examples serve to illustrate the invention. The temperatures are given in degrees centigrade. The parts and percentages are by weight, unless otherwise stated. Parts by weight relate to parts by volume as the kilogram relates to the liter.

The preparation of monoazo or disazo intermediates has not been described in all cases in the following illustrative embodiments, but it is anyhow readily apparent from the general description.

EXAMPLE 1

5.45 parts of the dye of the formula

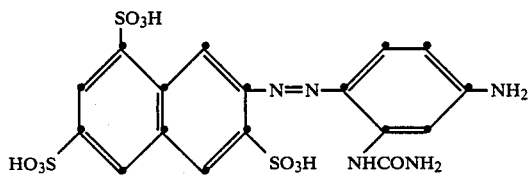

are dissolved in 100 parts of water under neutral conditions, and 50 parts of ice are added, followed with vigorous stirring by a solution of 2.12 parts of 2,4,6-trifluoro-5-methylsulfonylpyrimidine in 20 parts of acetone. The solution is brought back to pH 7 by the dropwise addition of about 11 parts of 1N sodium hydroxide solution. After the complete acylation of the amino group the solution of the difluoro compound has added to it a neutral solution of 2.81 parts of 1-aminophenyl-3-β-sulfatoethyl sulfone in 50 parts of water, the temperature is raised to 30° to 35°, and the solution is kept at pH 5–6 by the dropwise addition of 1N sodium hydroxide solution. As soon as the second condensation has ended, the monofluoropyrimidine dye formed is salted out with potassium chloride, is filtered off and is dried at 40° to 50° in vacuo.

The dye thus obtained dyes cotton gold yellow shades.

EXAMPLE 2

5.53 parts of the dye of the formula

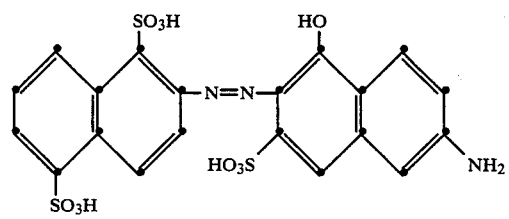

are dissolved in 100 parts of water under neutral conditions, and 50 parts of ice are added, followed with vigorous stirring by a solution of 2.12 parts of 2,4,6-trifluoro-5-methylsulfonylpyrimidine in 20 parts of acetone. The solution is brought back to pH 7 by the dropwise addition of about 11 parts of 1N sodium hydroxide solution. After the complete acylation of the amino group the solution of the difluoropyrimidine dye has added to it 2.07 parts of β-(β-chloroethylsulfonyl)-ethylamine hydrochloride, the temperature is raised to 30° to 35°, and the solution is held at pH 5–6 by the dropwise addition of about 9 parts of 1N sodium hydroxide solution. After the condensation has ended the dye formed is salted out by adding 25 parts by volume of sodium chloride, is filtered off and is dried at 40° to 50° in vacuo.

The dye thus obtained dyes cotton in orange shades.

EXAMPLE 3

A solution of 2.12 parts of 2,4,6-trifluoro-5-methylsulfonylpyrimidine in 20 parts of acetone is added with vigorous stirring to a neutral solution of 3.61 parts of bis-[β-(β-chloroethylsulfonyl)-ethyl]-amine hydrochloride in 100 parts of ice-water, and the solution is brought back to pH by the dropwise addition of about 10 parts of 1N sodium hydroxide solution. This neutral solution of the primary condensation product then has added to it a neutral solution of 4.38 parts of the dye of the formula

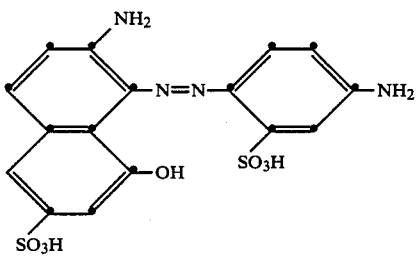

The reaction mixture is raised to 30° to 35°, and the solution is held at pH 5–6 by the dropwise addition of about 10 parts of 1N sodium hydroxide solution. After the acylation has ended the monofluoropyrimidine dye formed is salted out with sodium chloride, is filtered off and is dried at 40° to 50° C. in vacuo.

The dye thus obtained dyes cotton in bluish red shades.

The condensation of 2,4,6-trifluoro-5-methylsulfonylpyrimidine with the amino-containing dyes of column I and the amines of column II as described in Examples 1 to 3 gives further monofluoropyrimidine dyes which dye cotton in the shades indicated in column III.

| I | II | III |
|---|---|---|
| ![structure with CH3O-phenyl-N=N-naphthol with SO3H, HO3S, NH2 substituents] | 1-aminophenyl-3-β-sulfatoethyl sulfone | scarlet |
| " | 1-aminophenyl-4-β-sulfatoethyl sulfone | scarlet |

-continued

| I | II | III |
|---|---|---|
| (structure: pyridone with H2NCO, CH3, N-C2H5, OH, azo to phenyl-SO3H, NH2) | 1-aminophenyl-4-β-sulfatoethyl sulfone | greenish yellow |
| " | β-(β-chloroethylsulfonyl)-ethylamine | greenish yellow |
| (structure: pyridone with HO3SCH2, CH3, N-C2H5, OH, azo to phenyl-SO3H, NH2) | β-(β-chloroethylsulfonyl)-ethylamine | greenish yellow |
| (structure: pyrazole with CH3, OH, N-naphthalene-disulfonic acid, azo to phenyl-SO3H, NH2) | 1-aminophenyl-3-β-sulfatoethyl sulfone | yellow |
| " | β-(β-chloroethylsulfonyl)-ethylamine | yellow |
| (structure: pyrazole with HOOC, OH, N-phenyl-SO3H, azo to phenyl-SO3H, NH2) | β-(β-chloroethylsulfonyl)-propylamine | yellow |
| " | bis-[β-(β-chloroethyl-sulfonyl)-ethyl]-amine | yellow |
| (structure: methoxyphenyl-SO3H azo naphthol with SO3H and NHCH3) | β-(β-sulfato ethylsulfonyl)-ethylamine | scarlet |
| (structure: naphthalene trisulfonic acid azo phenyl with NH2 and NHCONH2) | β-(β-sulfato-ethylsulfonyl)-ethylamine | golden yellow |

-continued

| I | II | III |
|---|---|---|
| [structure: 1,5-disulfonaphthalene azo 1-hydroxy-3-sulfo-6-amino naphthalene] | β-vinylsulfonyl-ethylamine | orange |
| " | β-(β-chloro-ethylsulfonyl)-ethylamine | orange |
| [structure: 1,5-disulfonaphthalene azo 8-hydroxy-7-sulfo-5-(4-aminobenzoylamino)-3-sulfo naphthalene] | β-(β-chloro-ethylsulfonyl)-ethylamine | bluish red |
| [structure: copper complex azo dye with two naphthalene units, amino and sulfo groups] | β-(β-chloro-ethylsulfonyl)-ethylamine | blue |
| [structure: disulfonaphthalene azo dimethylphenylene azo aminonaphthalene sulfonic acid] | bis-[β-(β-chloroethyl-sulfonyl)-ethyl]-amine | brown |
| [structure: 1,5-disulfonaphthalene azo 4-amino-2-acetylamino benzene] | β-(β-sulfato-ethylsulfonyl)-ethylamine | yellow |
| [structure: 5-aminomethyl-1-sulfo naphthalene azo 8-hydroxy-7-sulfo-5-benzoylamino-3-sulfo naphthalene] | N—methyl-N—β-(β-chloroethyl-sulfonyl)-ethylamine | bluish red |

-continued
| I | II | III |
|---|---|---|
| 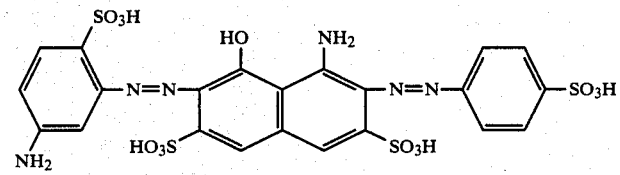 | β-(β-sulfato-ethylsulfonyl)-ethylamine | dark blue |
| 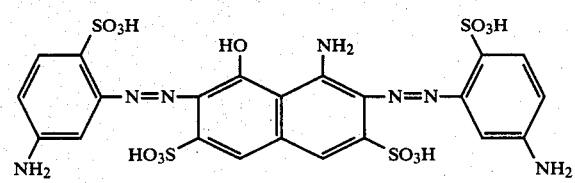 | β-(β-sulfato-ethylsulfonyl)-ethylamine | greenish navy |
| 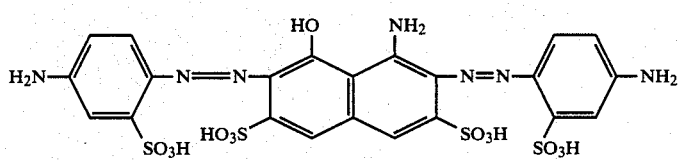 | β-(β-sulfato-ethylsulfonyl)-ethylamine | greenish blue |
| 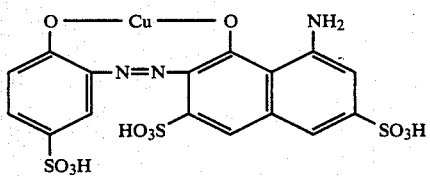 | β-(β-sulfato-ethylsulfonyl)-ethylamine | violet |
| 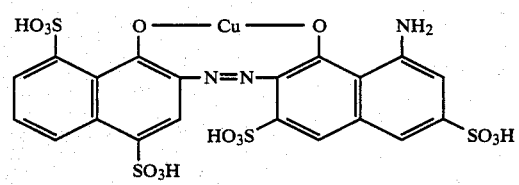 | β-vinylsulfonyl-ethylamine | blue |
| 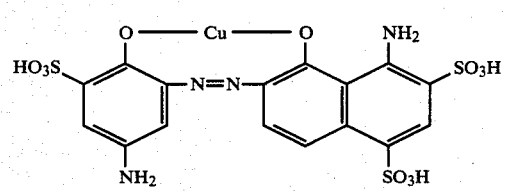 | 1-aminophenyl-3-vinyl sulfone | reddish blue |
| 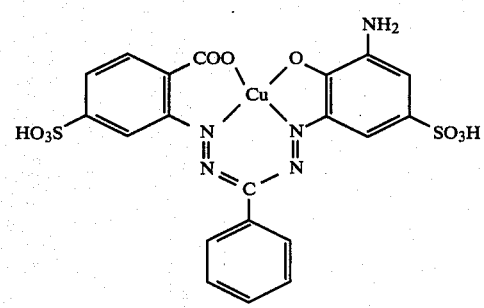 | 1-aminophenyl-4-vinyl sulfone | blue |

| I | II | III |
|---|---|---|
| [anthraquinone structure with NH₂, SO₃H, and NH-phenyl-NH₂-SO₃H substituents] | β-(β-chloro-ethylsulfonyl)-ethylamine | greenish blue |
| [anthraquinone structure with NH₂, SO₃H, and NH-tetramethylphenyl-SO₃H substituents] | β-(β-chloro-ethylsulfonyl)-ethylamine | Royal blue |
| [anthraquinone structure with NH₂, SO₃H, and NH-tetramethylphenyl(NH₂)-SO₃H substituents] | β-(β-thiosulfato-ethylsulfonyl)-ethylamine | Royal blue |
| " | β-(β-acetoxy-ethylsulfonyl)-ethylamine | Royal blue |
| [naphthalene-trisulfonic acid azo aminophenyl structure] | β-(β-acetoxy-ethylsulfonyl)-ethylamine | yellow |
| [bis-naphthalene azo structure with SO₃H, OH, NH₂ groups] | β-(β-acetoxy-ethylsulfonyl)-ethylamine | bluish red |
| [bis-naphthalene azo structure with chloro-triazinyl-aminophenyl-SO₃H-NH₂ substituent] | β-(β-sulfato-ethylsulfonyl)-ethylamine | bluish red |

-continued

| I | II | III |
|---|---|---|
| 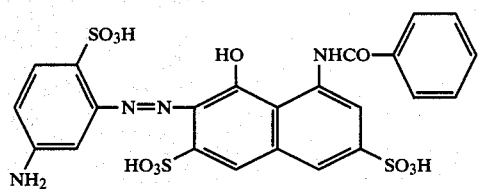 | β-(β-sulfato-ethylsulfonyl)-ethylamine | bluish red |
| 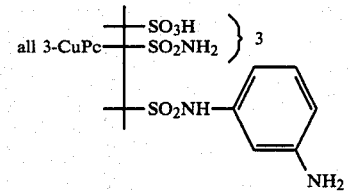 | β-(β-sulfato-ethylsulfonyl)-ethylamine | turquoise |
| 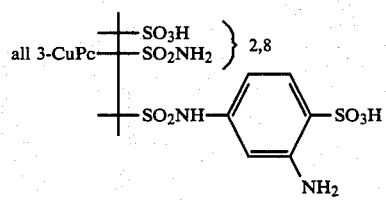 | β-(β-sulfato-ethylsulfonyl)-ethylamine | turquoise |
| 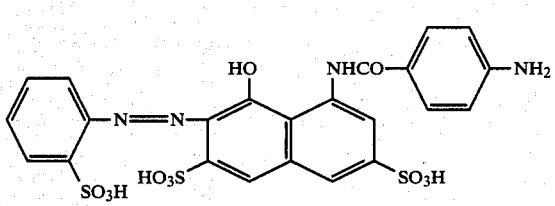 | β-(β-acetoxy-ethylsulfonyl)-ethylamine | red |
| 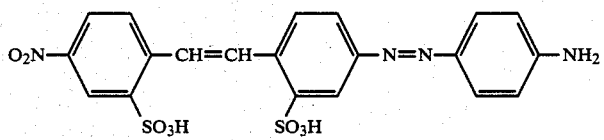 | β-(β-acetoxy-ethylsulfonyl)-ethylamine | yellow |
| 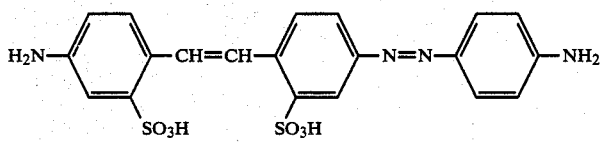 | β-(β-chloro-ethylsulfonyl)-ethylamine | yellow |
| 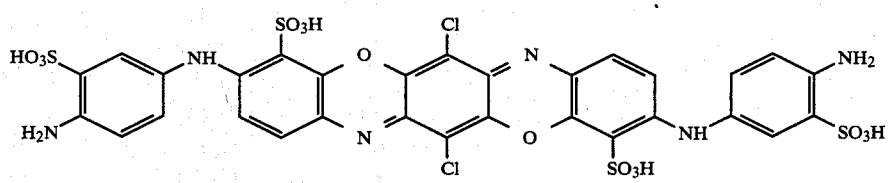 | β-(β-sulfato-ethylsulfonyl)-ethylamine | blue |
| 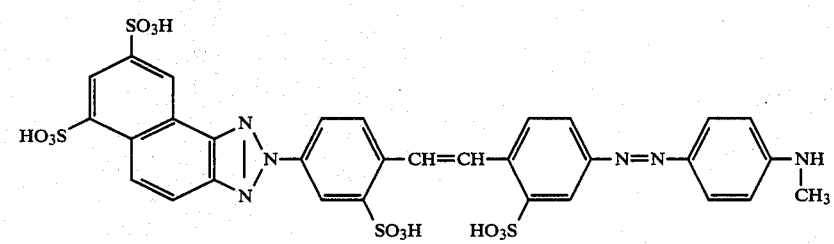 | β-(β-chloro-ethylsulfonyl)-ethylamine) | yellow |

-continued

| I | II | III |
|---|---|---|
| 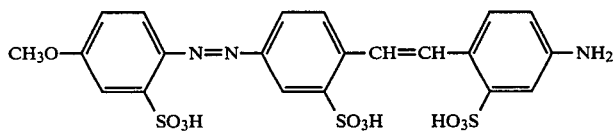 | 1-aminophenyl-4-β-sulfatoethyl sulfone | yellow |
| 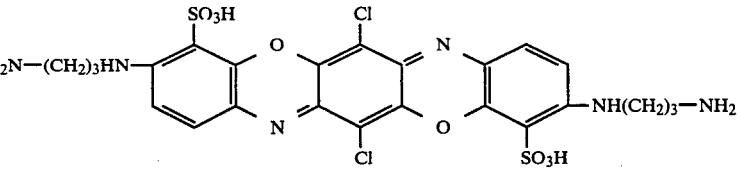 | 1-aminophenyl-4-β-sulfatoethyl sulfone | blue |
| 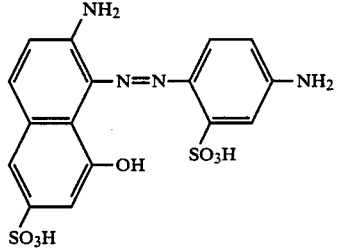 | β-(β-sulfato-ethylsulfonyl)-ethylamine | bluish red |
| 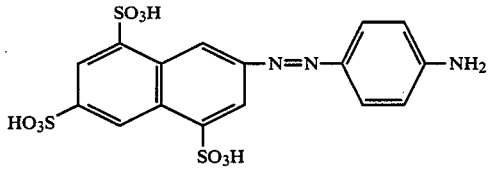 | β-(β-sulfato-ethylsulfonyl)-ethylamine | yellow |

EXAMPLE 4

A solution of 21 parts of 2,4,6-trichloro-5-methylsulfonylpyrimidine in 80 parts of acetone is added at room temperature with vigorous stirring to a neutral solution of 50.64 parts of the aminoazo dye of the formula

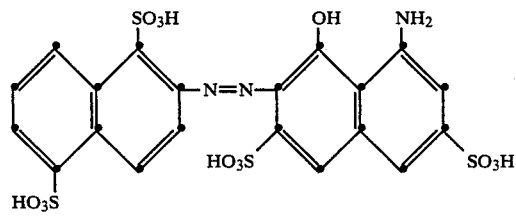

in 900 parts of water, and the mixture is left to react overnight. The next day the solution is brought to pH 7 with 2N sodium hydroxide solution and is clarified by filtering. The dye of the formula

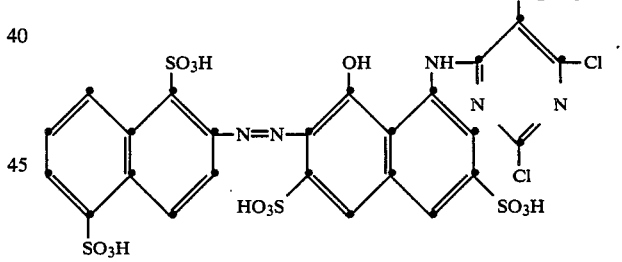

is salted out by adding 20% by volume of sodium chloride and is filtered off. The dye paste thus obtained is dissolved in 600 parts of water, and the solution has gradually added to it a solution of 16.3 parts of β-(β-chloroethylsulfonyl)ethylamine hydrochloride in 60 parts of water, while the solution is held at pH 7–8 with 1N sodium hydroxide solution.

After the amidation has ended the dye of the formula

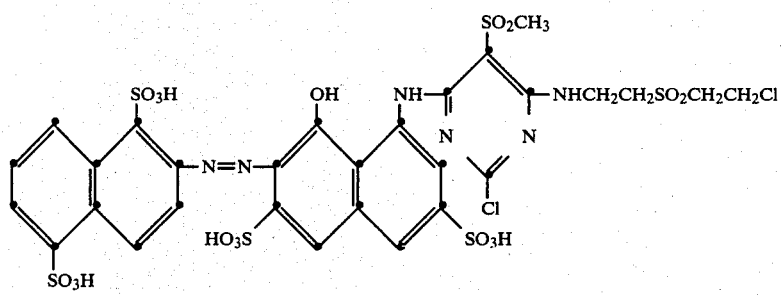

is salted out with potassium chloride, is filtered off and is dried at 40° to 50° C. in vacuo. The dye thus obtained dyes cotton in the cold pad-batch method in bluish red shades.

The condensation of 2,4,6-trichloro-5-methylsulfonylpyrimidine with the amino groups-containing dyes of column I and the amines of column II as described in the above example gives further dyes which dye cotton in the shades indicated in column III.

| I | II | III |
|---|---|---|
| " | 1-aminophenyl-3-β-sulfatoethyl sulfone | bluish red |
| 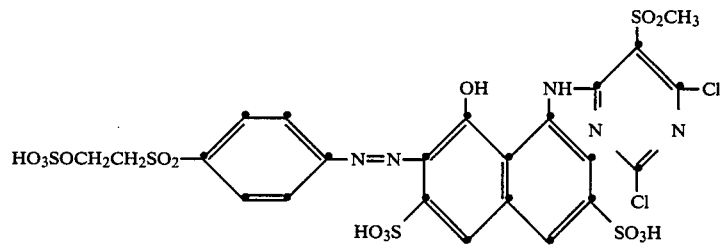 | 1-aminophenyl-3-β-sulfatoethyl sulfone | navy |

EXAMPLE 5

12.76 parts of 1-amino-8-hydroxynaphthalene-3,6-disulfonic acid are suspended at room temperature in 500 parts of water, and the suspension is brought to pH 6 with sodium hydroxide solution. The resulting solution has added to it a solution of 10.5 parts of 2,4,6-trichloro-5-methylsulfonylpyrimidine in 40 parts of acetone, and the mixture is vigorously stirred overnight. The next day the coupling component of the formula

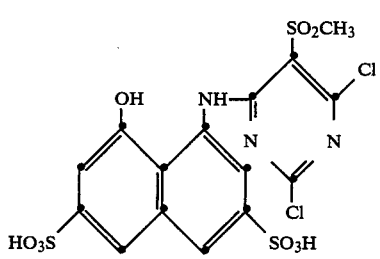

is clarified by filtering and is gradually added to a suspension of the diazonium salt prepared in conventional manner from 11.24 parts of 1-aminophenyl-4-β-sulfatoethyl sulfone, 20 parts of 2N sodium nitrate solution and 12 parts of 10N hydrochloric acid. The coupling mixture is slowly brought to pH 5 by the dropwise addition of 1N sodium hydroxide solution. After the coupling has ended the compound of the formula

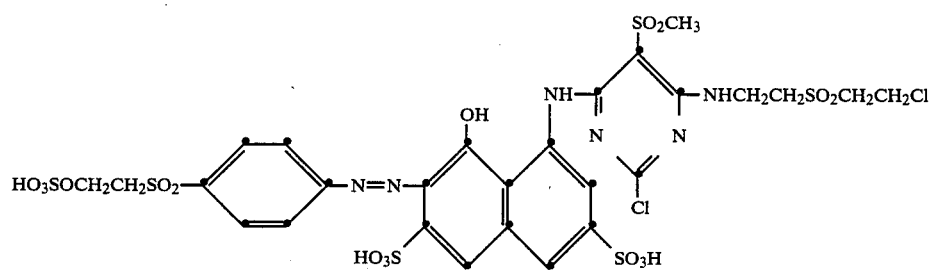

is salted out with 25% by volume of sodium chloride and is filtered off.

The dye paste obtained is then dissolved in 300 parts of water, and the solution has gradually added to it a solution of 8.32 parts of β-(β-chloroethylsulfonyl)-ethylamine hydrochloride in 30 parts of water, while pH 7-8 is maintained by the dropwise addition of 1N sodium hydroxide solution. After the amidation has ended the dye of the formula is evaporated to dryness at 40° C.

The dye thus obtained dyes cotton in the cold pad-batch method in bluish red shades.

EXAMPLE 6

28.91 parts of the amine of the formula

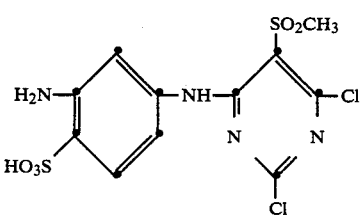

are diazotised in a conventional manner with nitrite and hydrochloric acid and are coupled at pH 3 onto 22.33 parts of 1-amino-8-hydroxynaphthalene-3,6-disulfonic acid. The red monoazo dye of the formula

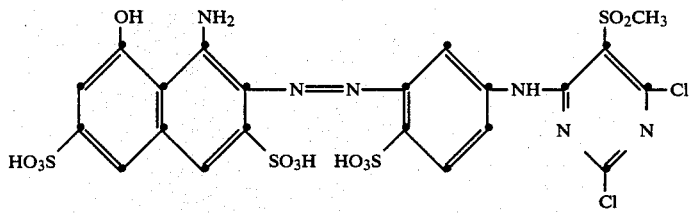

is isolated by adding 10% by volume of sodium chloride.

The dye paste obtained is suspended in 500 parts of water, and the suspension is gradually added to a suspension of a diazonium salt prepared in a conventional manner from 19.67 parts of 1-aminophenyl-4-β-sulfatoethyl sulfone, 35 parts of 2N sodium nitrite solution and 18 parts of 10N hydrochloric acid. The coupling mixture is gradually brought to pH 7 by the dropwise addition of 1N sodium hydroxide solution. The disazo dye of the formula

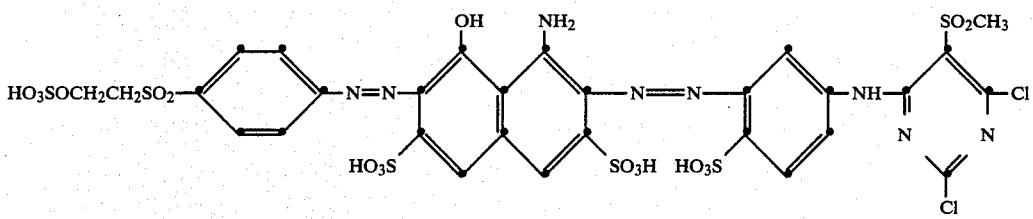

is salted out by sprinkling in 15% by volume of sodium chloride and is filtered off.

Amidation of this product with 14.56 parts of β-(β-chloroethylsulfonyl)-ethylamine hydrochloride finally leads to a dye of the formula The dye thus obtained dyes cotton in the cold pad-batch method in navy shades.

EXAMPLE 7

A diazonium salt prepared in conventional manner from 15.38 parts of the amine of the formula

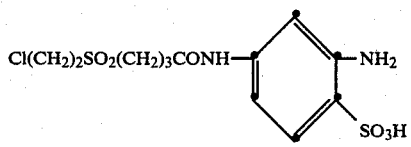

using 20 parts of 2N sodium nitrite solution and 12 parts of 10N hydrochloric acid is added to a solution of 21.76 parts of the coupling component of the formula

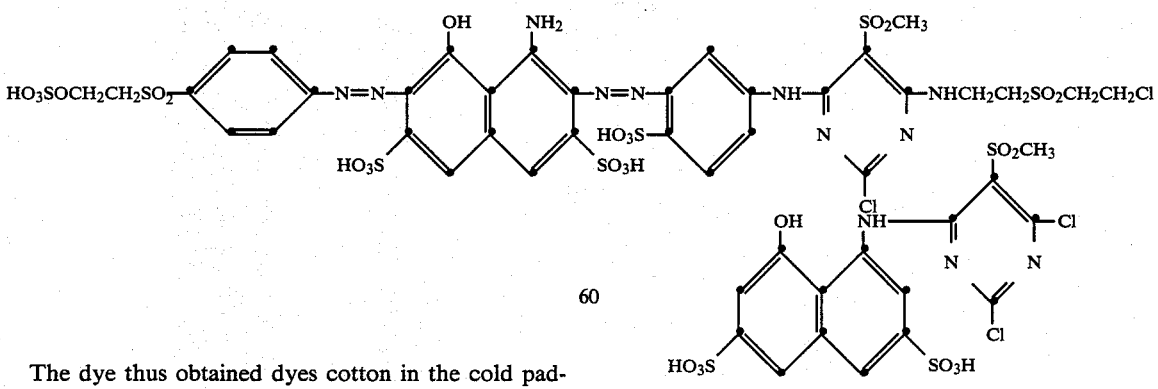

whose preparation is described in Example 5. The coupling mixture is gradually brought the pH 5 by the dropwise addition of 2N sodium hydroxide solution. After the coupling has ended the dye of the formula

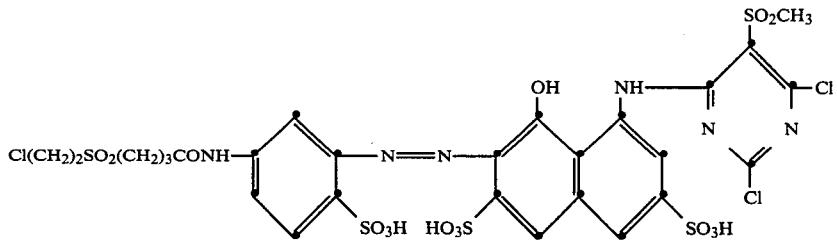

is salted out with 15% by volumes of sodium chloride and is filtered off.

The dye paste, in 500 parts of water, is then neutralised with sodium hydroxide solution and is amidated with 8.32 parts of β-(β-chloroethylsulfonyl)-ethylamine hydrochloride.

The dye thus obtained has the formula

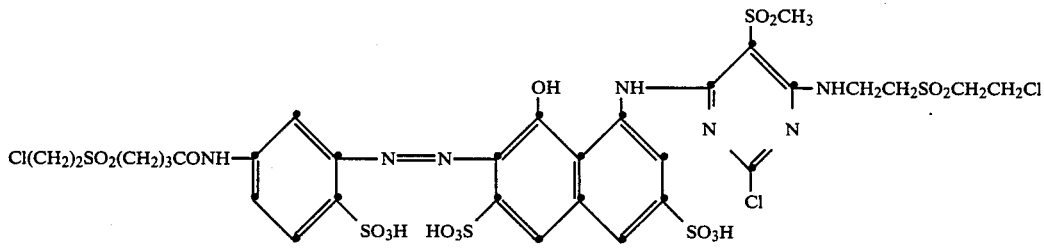

is evaporated to dryness and dyes cotton in the cold pad-batch method red shades.

Dyeing method I 2 parts of the dye obtained in Example 1 are dissolved in 400 parts of water; to this solution are added 1,500 parts of a solution which contains per liter 53 g of sodium chloride. 100 parts of a cotton fabric are introduced at 40° C. into this dyebath. After 45 minutes 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

Dyeing method II 2 parts of the reactive dye obtained in Example 1 are dissolved in 400 parts of water; to this solution are added 1,500 parts of a solution which contains per liter 53 g of sodium chloride. 100 parts of a cotton fabric are introduced at 35° C. into this dyebath. After 20 minutes 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

Dyeing method III 8 parts of the reactive dye obtained in Example 1 are dissolved in 400 parts of water; to this solution are added 1,400 parts of a solution which contains per liter 100 g of sodium sulfate. 100 parts of a cotton fabric are introduced at 25° C. into this dyebath. After 10 minutes 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

Dyeing method IV 4 parts of the reactive dye obtained in Example 1 are dissolved in 50 parts of water; to this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

Dyeing method V 6 parts of the reactive dye obtained in Example 1 are dissolved in 50 parts of water; to this solution are added 50 parts of a solution which contains per liter 16 g of sodium hydroxide and 0.04 liter of 38° Be sodium silicate. The resulting solution is applied to a cotton fabric on a pad-mangle in such a way that its weight increases by 70%, and the fabric is then wound on to a beam. In this state the cotton fabric is left at room temperature for 10 hours. The dyed fabric is then rinsed, is soaped off at the boil with a nonionic detergent for a quarter of an hour, is rinsed once more and is dried.

Dyeing method VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% strength solution of a nonionic detergent for a quarter of an hour, is rinsed and is dried.

Printing method I 3 parts of the reactive dye obtained in Example 1 are sprinkled with high-speed stirring into 100 parts of a stock thickening containing 50 parts of 5% strength sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, which is then dried, and the resulting printed fabric is steamed at 102° C. in saturated steam for 2 minutes. The printed fabric is then rinsed, if desired soaped off at the boil and rinsed once more, and is then dried.

Printing method II 5 parts of the reactive dye obtained in Example 1 are sprinkled with high-speed stirring into 100 parts of a stock thickening containing 50 parts of 5% strength sodium alginate thickening, 36.5 parts of water, 10 parts of urea, 1 part of sodium n-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, if desired soaped off at the boil and rinsed once more, and is then dried.

I claim:

1. A reactive dye of the formula

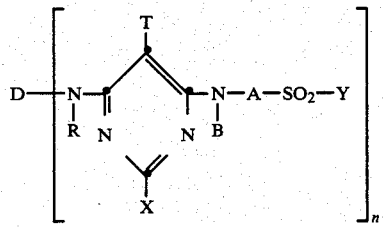

in which D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimid dye, R is hydrogen or $C_{1-4}$-alkyl unsubstituted or substituted by halogen, hydroxyl, cyano, $C_{1-4}$-alkoxy, carboxy or sulfo, or is methoxycarbonylmethyl, ethoxycarbonylmethyl, aminosulfonylmethyl or β-sulfatoethyl; X is halogen, low molecular alkylsulfonyl, phenylsulfonyl, a sulfonic acid, phosphonic acid or quaternised ammonium group; A is arylene unsubstituted or substituted by methyl, ethyl, methoxy, ethoxy, halogen, nitro, cyano, acetylamino, hydroxyl, carboxyl or sulfo or is $C_{2-6}$-alkylene unsubstituted or substituted by chlorine, cyano or hydroxyl; Y is —CH=CH$_2$ or —CH$_2$CH$_2$—Z; Z is sulfato, thiosulfato, acetato, phosphato or halogen; B is hydrogen, alkyl unsubstituted or substituted by halogen, hydroxy, cyan, alkoxy, methoxycarbonyl, ethoxycarbonyl, aminosulfonyl, sulfato, carboxy or sulfo, or is cyclohexyl, or phenyl unsubstituted or substituted by methyl, ethyl, methoxy, ethoxy, chloro, bromo, carboxy, sulfo or sulfomethyl, or is a radical of the formula

—A—SO$_2$—Y in which A and Y are as defined above; T is nitro, alkoxysulfonyl, alkylsulfonyl, alkylsulfinyl, cyano, alkoxycarbonyl, carboxyl, alkanoyl, chlorine or hydroxyl; and n is 1 or 2.

2. A reactive dye according to claim 1 in which X is fluorine or chlorine.

3. A reactive dye according to claim 1 in which T is methylsulfonyl.

4. A reactive dye according to claim 1 in which B is hydrogen or $C_{1-4}$-alkyl; and A is phenylene or naphthylene or $C_{2-6}$-alkylene unsubstituted or substituted by chlorine, cyano or hydroxyl.

5. A reactive dye according to claim 1 in which A is ethylene.

6. A reactive dye according to claim 4, of the formula

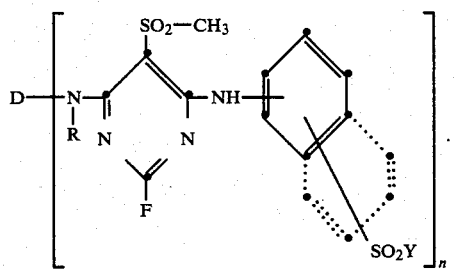

7. A reactive dye according to claim 4, of the formula

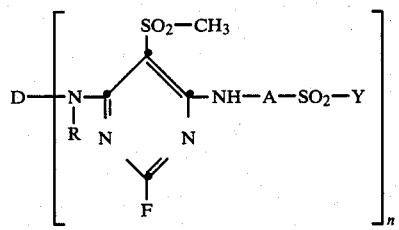

in which A is $C_{2-4}$-alkylene.

8. A reactive dye according to claim 7 in which A is ethylene.

9. A reactive dye according to claim 1, of the formula

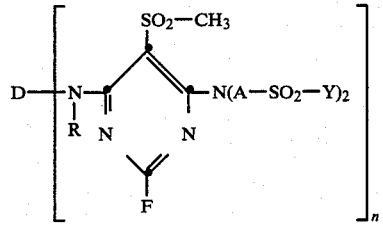

in which D, R, Y and n are as defined in claim 1 and A is $C_{2-4}$-alkylene.

10. A reactive dye according to claim 9 in which A is ethylene.

11. A reactive dye according to claim 1 in which Y is vinyl, β-sulfatoethyl, β-thiosulfatoethyl, β-phosphatoethyl, β-chloroethyl or β-acetoxyethyl.

12. A reactive dye according to claim 11 in which D is the radical of a monoazo or disazo dye.

13. A reactive dye according to claim 11 in which D is the radical of a metal complex azo or formazan dye.

14. A reactive dye according to claim 11 in which D is the radical of an anthraquinone dye.

15. A reactive dye according to claim 13 in which D is the radical of a 1:1 copper complex benzene or naphthalene azo dye and the copper atom is bonded on either side to a metallisable group in the ortho-position relative to the azo bridge.

16. A reactive dye according to claim 12, of the formula

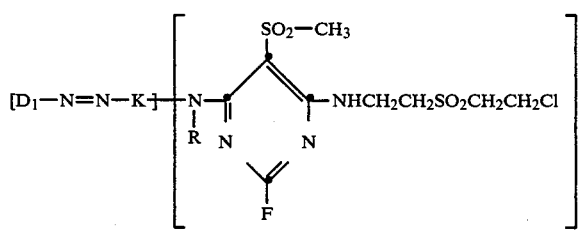

in which $D_1$ is the radical of a benzene or naphthalene diazo component, K is the radical of a benzene or naphthalene or heterocyclic coupling component, R is hydrogen, methyl or ethyl, n is 1 or 2, and the pyrimidine radical is bonded to the diazo component or to the coupling component, or a pyrimidine radical each is bonded to the diazo component and to the coupling component.

17. A reactive dye according to claim 12, of the formula

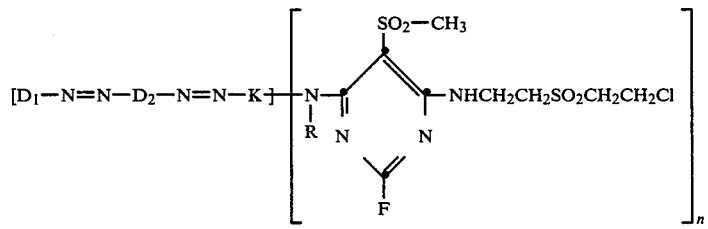

in which $D_1$ and $D_2$ are each a radical of a benzene or naphthalene diazo component, K is the radical of a benzene or naphthalene or heterocyclic coupling component, R is hydrogen, methyl or ethyl, n is 1 or 2, and the pyrimidine radical is bonded to diazo component $D_1$ or to coupling component K, or a pyrimidine radical each is bonded to $D_1$ and K.

18. A reactive dye according to claim 12, of the formula

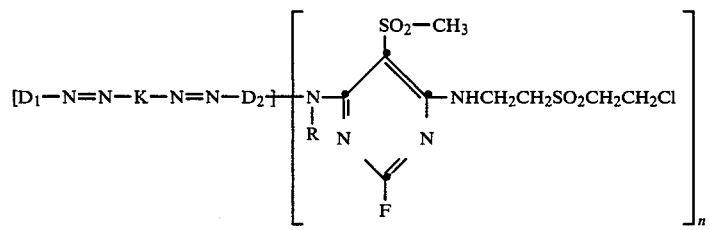

in which $D_1$ and $D_2$ are each a radical of a benzene or naphthalene diazo component, K is the radical of an aminonaphtholsulfonic acid coupling component, R is hydrogen, methyl or ethyl, n is 1 or 2, and the pyrimidine radical is bonded to diazo component $D_1$ or to diazo component $D_2$, or a pyrimidine radical each is bonded to $D_1$ and $D_2$.

19. A 1:1 copper complex of a reactive dye according to claim 17.

* * * * *